(12) United States Patent
Cowart

(10) Patent No.: US 12,543,772 B2
(45) Date of Patent: Feb. 10, 2026

(54) ROTATABLE SYSTEM TO REPETITIVELY PREPARE FOOD PATTIES FROM A SOURCE OF FLOWING FOOD

(71) Applicant: MP EQUIPMENT, LLC, Gainesville, GA (US)

(72) Inventor: Gary Cowart, Gainesville, GA (US)

(73) Assignee: MP EQUIPMENT, LLC, Gainesville, GA (US)

( * ) Notice: Subject to any disclaimer, the term of this patent is extended or adjusted under 35 U.S.C. 154(b) by 216 days.

(21) Appl. No.: 18/139,666

(22) Filed: Apr. 26, 2023

(65) Prior Publication Data

US 2023/0354875 A1   Nov. 9, 2023

Related U.S. Application Data

(60) Provisional application No. 63/338,255, filed on May 4, 2022.

(51) Int. Cl.
A23P 30/10 (2016.01)
A22C 7/00 (2006.01)

(52) U.S. Cl.
CPC .................................. *A23P 30/10* (2016.08)

(58) Field of Classification Search
CPC ...... A23P 30/10; A22C 7/0076; A22C 7/0092
See application file for complete search history.

(56) References Cited

U.S. PATENT DOCUMENTS

| 2,475,463 A | 7/1949 | Santo |
|---|---|---|
| 3,550,189 A | 12/1970 | Lotz |
| 3,623,188 A | 11/1971 | Holly |
| 4,298,326 A | 11/1981 | Orlowski |
| 7,014,456 B1 | 3/2006 | Tournour et al. |
| 8,469,697 B2 | 6/2013 | Lindee et al. |
| 9,282,753 B2 | 3/2016 | Hausladen et al. |
| 9,457,495 B2 | 10/2016 | Lindee et al. |
| 9,474,286 B2 | 10/2016 | Van Der Eerden et al. |
| 9,521,853 B2 | 12/2016 | Taylor et al. |
| 9,730,467 B2 | 8/2017 | Van Gerwen et al. |

(Continued)

OTHER PUBLICATIONS

Search Regort & Written Oginion issued in PCT/US2023/019971 (Jul. 25, 2023).

(Continued)

*Primary Examiner* — Galen H Hauth
*Assistant Examiner* — Baileigh Kate Darnell
(74) *Attorney, Agent, or Firm* — Barnes & Thornburg LLP

(57) ABSTRACT

An apparatus for preparing a plurality of uniformly formed food products. The apparatus includes a rotatable mold plate with a plurality of voids, the plurality of voids are collected into one or more sets of voids in close proximity to each other. A first cover plate is fixed with the mold plate rotatable about the first cover plate. First and second apertures are disposed through the first cover plate, wherein each void of the plurality of voids. A vacuum is applied to the void through the first aperture and flowing food enters the void through the second aperture. The first cover plate has an empty space or is sized to expose a portion of the mold plate. A knock-out assembly is disposed with respect to the voids when outside of the first cover plate, wherein the knockout assembly interacts with voids to remove food patties from the voids.

23 Claims, 11 Drawing Sheets

(56) References Cited

U.S. PATENT DOCUMENTS

| | | | |
|---|---|---|---|
| 2004/0132396 A1* | 7/2004 | Gallant | A22C 7/0084 |
| | | | 452/175 |
| 2008/0181997 A1 | 7/2008 | Cowart | |
| 2015/0351418 A1 | 12/2015 | Lindee et al. | |
| 2016/0213010 A1 | 7/2016 | Petrovic et al. | |
| 2017/0215438 A1 | 8/2017 | Palese et al. | |
| 2019/0274348 A1* | 9/2019 | Fujimori | A22C 7/0084 |

OTHER PUBLICATIONS

CA Office Action from corresponding CA patent application No. 3198106 (Jul. 3, 2025).

* cited by examiner

ROTATABLE SYSTEM TO REPETITIVELY PREPARE FOOD PATTIES FROM A SOURCE OF FLOWING FOOD

TECHNICAL FIELD

This application claims priority from U.S. Provisional Patent Application No. 63/338,255 filed May 4, 2022, the entirety of which is fully incorporated by reference herein.

TECHNICAL FIELD

The subject specification relates to a system of repetitively prepare food patties from a source of flowing food and deposit the formed food patties onto a conveyor or other location for further processing, cooking, or packaging. The subject specification has various significant advantages and improvements over conventional system so to repetitively prepare food patties that are currently known and used in industry.

BRIEF SUMMARY

A first representative embodiment of the disclosure is provided. The embodiment includes an apparatus for preparing a plurality of uniformly formed food products. A mold plate with a plurality of voids disposed therein, the mold plate comprising a center and an arcuate outer edge, the mold plate is rotatable about the center. The plurality of voids collectively organized into a first set and a second set, the plurality of voids within the first set disposed with a consistent spacing between adjacent voids and the plurality of voids arranged within the second set disposed with a consistent spacing between adjacent voids, wherein a void at an end of the arranged voids of the first set is further from the closest void within the second set than a spacing of adjacent voids within the first set and a spacing of adjacent voids within the second set, wherein no voids are located within the mold plate between the voids of the first set and the voids of the second set. A transmission disposed in conjunction with the mold plate to transfer torque to the mold plate to cause the mold plate to rotate about the center of the mold plate. A first cover plate fixed with the mold plate rotatable about the first cover plate, the first cover plate disposed in parallel to the mold plate, a first aperture disposed through the first cover plate and a second aperture disposed through the first cover plate, wherein each void of the plurality of voids of the mold plate is aligned sequentially with the first aperture and then aligned with the second aperture as the mold plate is rotated about its center, the first cover plate defining an empty space that exposes an arc length of the mold plate as the mold plate rotates and covering a remaining portion of the mold plate or the dimensions of the first cover plate are such that a portion of the mold plate with the plurality of voids extend outside of the first cover plate. A knock-out assembly is disposed with respect to the empty space to interact with the mold plate that is disposed in registry with the empty space of the first cover plate or the knock-out assembly is disposed outside of the first cover plate, wherein the knockout assembly interacts with voids disposed within the empty space or outside of the first cover plate. A filling system is disposed in registry with the second aperture of the first cover plate to direct a flow of food product through the second aperture and into one or more voids of the mold plate that are disposed in registry with the second aperture.

A second representative embodiment of the disclosure is provided. The embodiment includes an apparatus for preparing a plurality of uniformly formed food products. The apparatus includes a mold plate with a plurality of voids disposed therein, the mold plate comprising a center and an arcuate outer edge, the mold plate is rotatable about the center. The plurality of voids are arranged with consistent spacing around the mold plate such that a center of each void of the plurality of voids is arranged at a consistent radial arc length from a center of the voids that are adjacent to the void. A transmission disposed in conjunction with the mold plate to transfer torque to the mold plate to cause the mold plate to rotate about the center of the mold plate. A first cover plate fixed with the mold plate rotatable about the first cover plate, the first cover plate disposed in parallel to the mold plate, a first aperture disposed through the first cover plate and a second aperture disposed through the first cover plate, wherein each void of the plurality of voids of the mold plate is aligned sequentially with the first aperture and then aligned with the second aperture as the mold plate is rotated about its center, the first cover plate defining an empty space that exposes an arc length of the mold plate as the mold plate rotates and covering a remaining portion of the mold plate or the dimensions of the first cover plate are such that a portion of the mold plate with the plurality of voids extend outside of the first cover plate. A knock-out assembly is disposed with respect to the empty space to interact with the mold plate that is disposed in registry with the empty space of the first cover plate or the knock-out assembly is disposed outside of the first cover plate, wherein the knockout assembly interacts with voids disposed either within the empty space or outside of the first cover plate. A filling system is disposed in registry with the second aperture of the first cover plate to direct a flow of food product through the second aperture and into one or more voids of the mold plate that are disposed in registry with the second aperture.

A third representative embodiment of the disclosure is provided. The embodiment includes an apparatus for preparing a plurality of uniformly formed food products. The apparatus includes a mold plate with a plurality of voids disposed therein, the mold plate comprising a center and an arcuate outer edge, the mold plate is rotatable about the center. The plurality of voids are collectively organized in close proximity to each other to establish a set of voids within the mold plate, wherein the voids within the set are disposed with a consistent spacing between adjacent voids, wherein no voids are located within the mold plate between the voids that are disposed at the opposite ends of the set of voids. A transmission is disposed in conjunction with the mold plate to transfer torque to the mold plate to cause the mold plate to rotate about the center of the mold plate. A first cover plate is fixed with the mold plate rotatable about the first cover plate, the first cover plate disposed in parallel to the mold plate, a first aperture disposed through the first cover plate and a second aperture disposed through the first cover plate, wherein each void of the plurality of voids of the mold plate is aligned sequentially with the first aperture and then aligned with the second aperture as the mold plate is rotated about its center, the first cover plate defining an empty space that exposes an arc length of the mold plate as the mold plate rotates and covering a remaining portion of the mold plate or the dimensions of the first cover plate are such that a portion of the mold plate with the plurality of voids extend outside of the first cover plate. A knock-out assembly is disposed with respect to the empty space to interact with the mold plate that is disposed in registry an the empty space defined within the first cover plate or the knock-out assembly is disposed outside of the first cover plate, wherein the knockout assembly interacts with voids disposed within the empty space or outside of the first cover plate. A filling system is disposed in registry with the second aperture of the first cover plate to direct a flow of food product through the second aperture and into one or more voids of the mold plate that are disposed in registry with the second aperture.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION OF THE DRAWINGS

Figure 4:
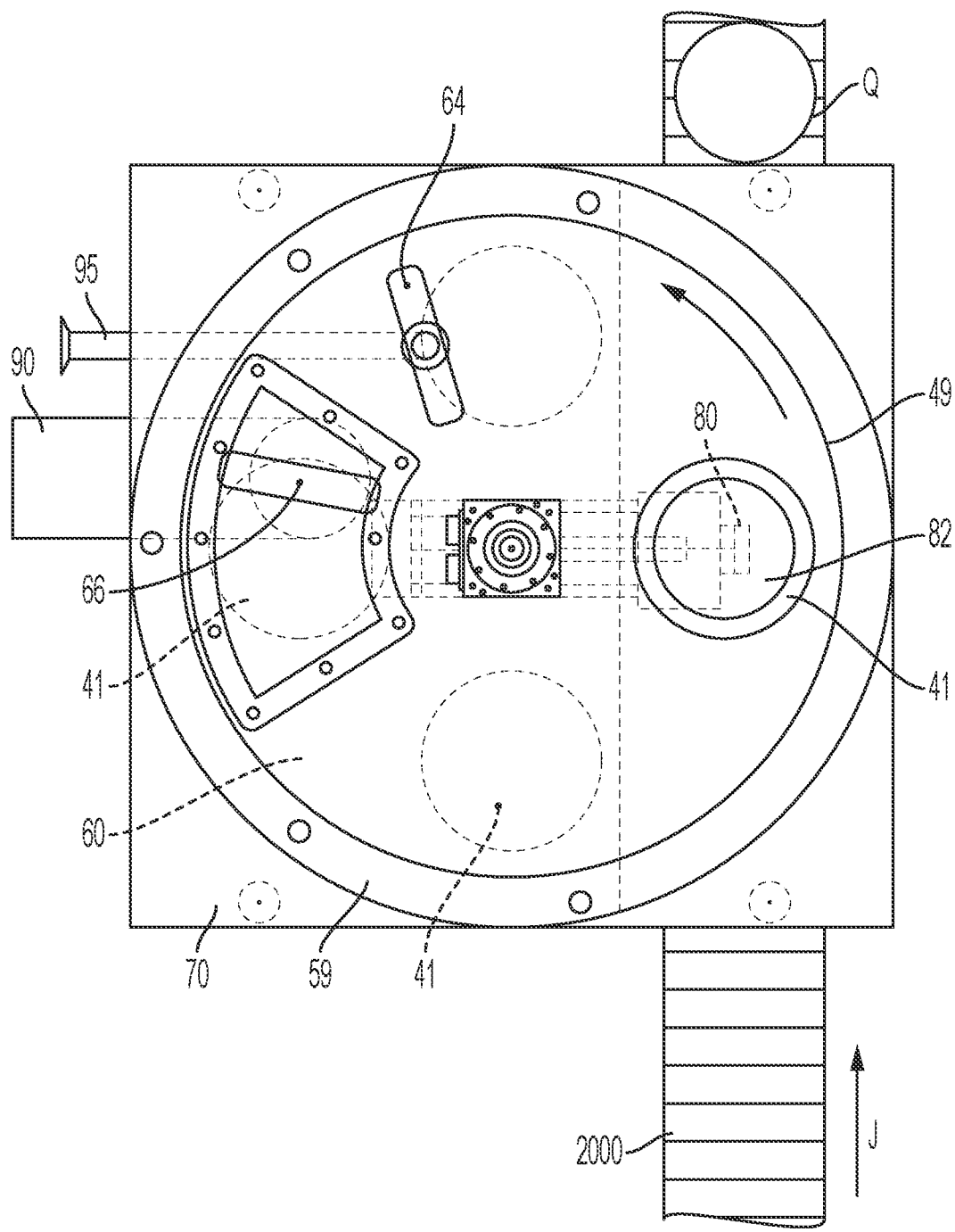
FIG. 4 is a top view of the system of FIG. 1 with the second cover plate and the mold plates shown in transparent form to allow viewing the mold plate and the first cover plate below the second cover plate, depicting a void of the mold plate in registry with a knockout cup, and voids in partial alignment with the first and second apertures in the first cover plate, and a conveyor moving below the knock out assembly.

Turning now to FIGS. 1-9, various related systems 10, 100, 200, 300 for molding food portions are provided. There are multiple embodiments of the system disclosed herein. Element numbers with the same tenths and ones digits across different embodiments designate the same or similar components and any specific structural or functional differences within the components with the same tenths and ones digits will be specifically described herein. The system 10, 100, 200 is provided to rapidly form food patties of a desired size and shape from an pumped flowing food input and then deposit the food patties (Q) in a uniform manner upon a conveyor 2000 that may move (J) with respect to the system (schematic) as depicted in FIG. 4, or another structure within a processing or packaging system to allow the food patties to be further processed, packaged, or cooked. The systems 10, 100, 200 disclosed herein are provided to allow for differing rates of food patty production depending upon the volume needs of the facility.

The system 10 generally includes a rotatable mold plate 40 that includes a plurality of voids 41 that are configured to receive food therein, such as food that has previously been processed and is pumped into the apertures. The mold plate is supported by a first cover plate 60, and a second cover plate 70, which collectively enclose both opposite faces surfaces 44, 45 of the mold plate. A knockout assembly 80 is provided to interact with the plurality of apertures 42 when aligned therewith to urge the food within the voids 41 to fall from the mold plate for further use, such as cooking or packaging. The system 10 may be configured to individually deposit molded food products or to deposit several molded food products simultaneously.

A first embodiment of the system 10 is provided and depicted in FIGS. 1-4a. The system 10 includes a mold plate 40, that is sandwiched between a first cover plate 60 and a second cover plate 70. The first cover plate 60 is disposed below a bottom surface 45 of the mold plate. In conventional systems to mold food products the first cover plate 60 is sometimes referred to as a top plate. The second cover plate 70 is disposed above a top surface 44 of the mold plate. In conventional systems the second cover plate 70 is sometimes referred to as a mold cover.

Figure 3:
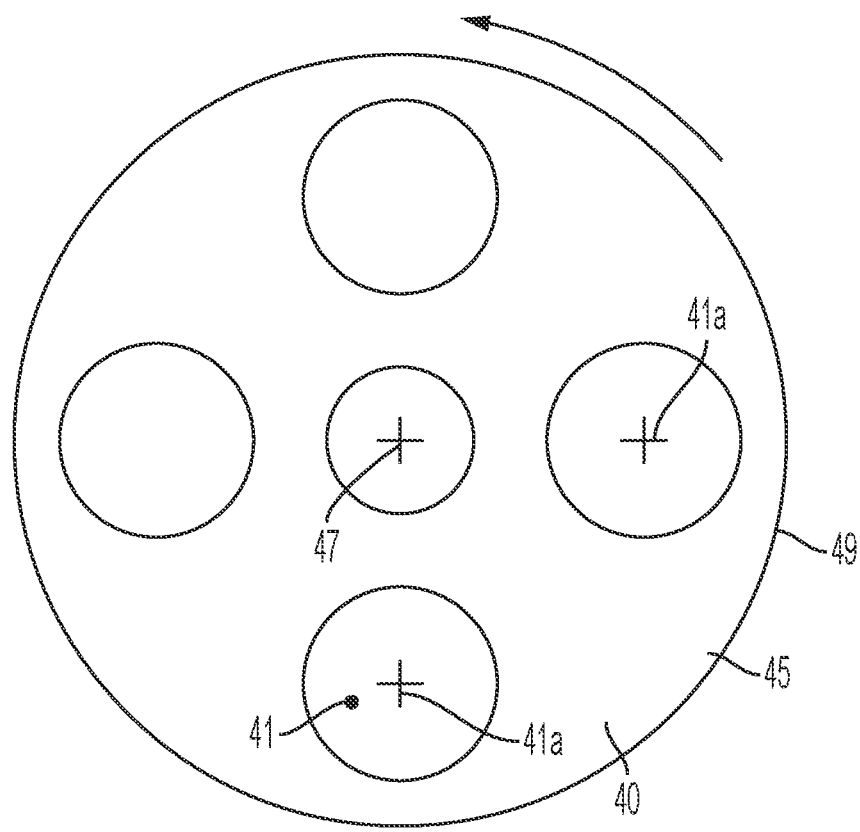
FIG. 3 is a top view of a mold plate usable in the system of FIG. 1.
Figure 3A:
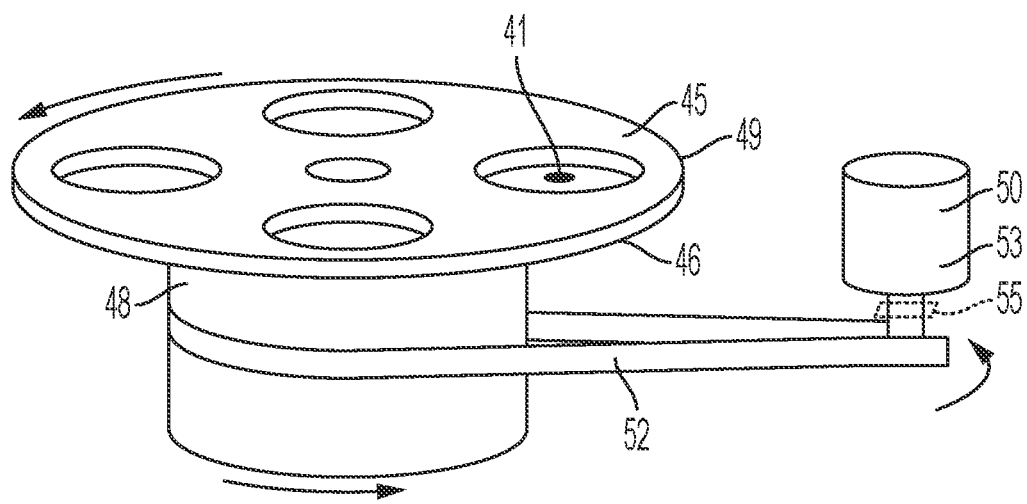
FIG. 3a is a schematic view of a transmission used to cause the mold plate to rotate.

The mold plate 40 includes a plurality of voids 41 that are disposed about the mold plate with the voids 41 extending through the plate 40. In some embodiments, such as the embodiments depicted in FIGS. 3 and 3A the plurality of voids 41 are spaced with a consistent spacing around the plate such that the centers 41a of the voids are each at a consistent arc length away from the centers 41a of adjacent voids. In this embodiment the mold plate 40 has four circular voids 41 that are spaced such that their centers are 90 degrees apart. In other embodiments, the voids 41 may be provided with uniform but non-circular shapes and in those embodiments, adjacent voids are spaced with the same feature of each void spaced at a consistent arc length from the same feature on the adjacent voids. In all embodiments of this specification the voids (e.g. 41 are depicted as circular, but the voids could be other shapes such as oval, elliptical, triangular, square, rectangular, or other geometric or non-geometric or arbitrary shapes—which may be desired in the art to produce food patties of those shapes) are uniformly sized and shaped to result in uniformly sized and shaped food patties. The mold plate 40 has an arcuate outer edge 49, and is preferably circular but can be in other shapes as desired. The mold plate has a center 47, that forms the axis of rotation. In some embodiments, the mold plate 40 extends to the center 47, while in other embodiments the center 47 of the mold plate is the geometric center and axis of rotation but is within an empty central portion of the mold plate 40.

Figure 1:
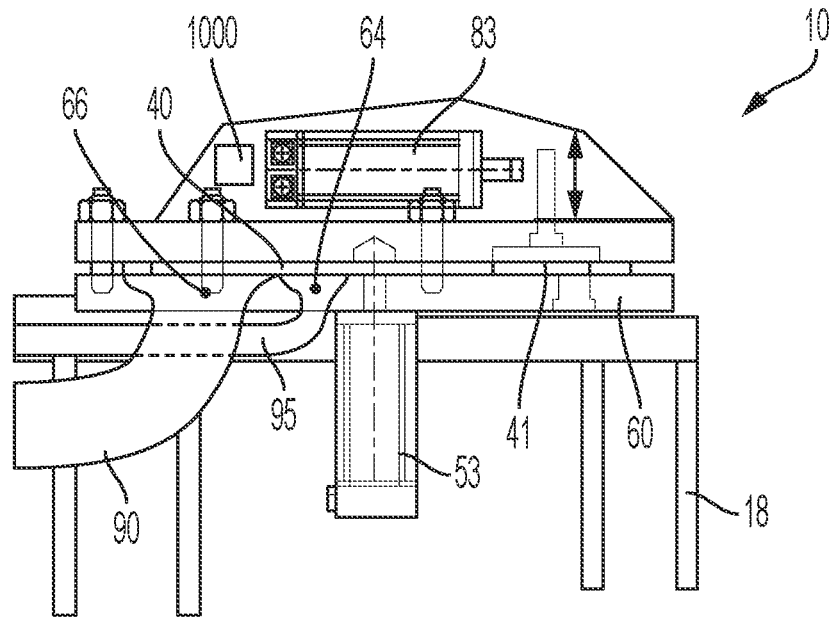
FIG. 1 is a side view of a system to rapidly from food patties using a rotating mold plate, with the knockout assembly in the engaged position.

The mold plate 40 may be rotated directly by a motor 50 (as depicted in FIG. 1) while alternatively, the mold plate 40 may be rotated by a transmission 50 that may include a remote motor 53 that transfers torque to the mold plate, such as by a belt drive 52. As discussed in detail below, the transmission 52 or direct motor drive 53 are controlled by a controller 1000, which operates to selectively rotate the mold plate 40, and in some embodiments, rotate the mold plate 40 at different speeds when the mold plate 40 is in differing positions, to facilitate the efficient formation of food patties within the voids 41 and the ejection of the formed food patties from the voids 41 for further processing, packaging, or cooking.

Figure 4A:
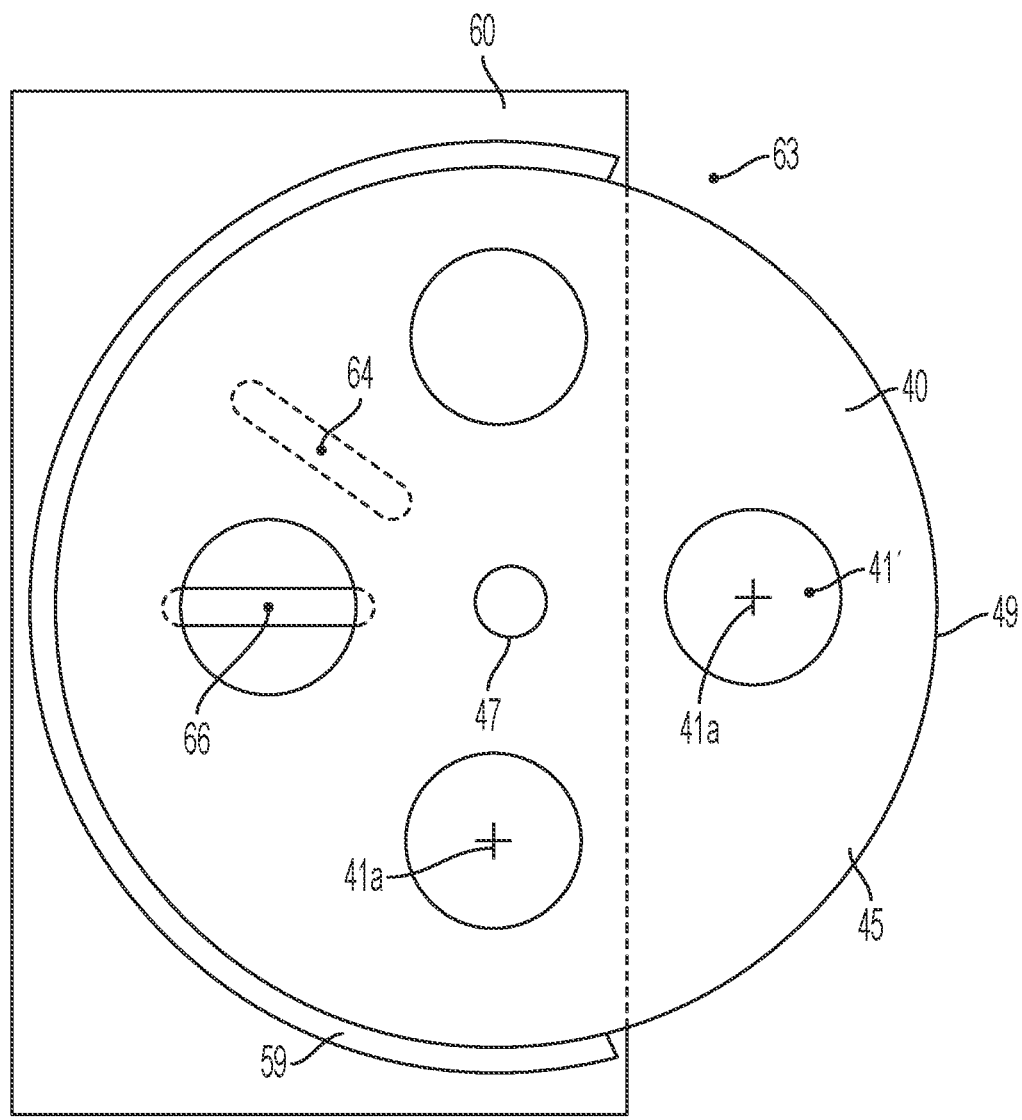
FIG. 4a is a top view of the mold plate and the first cover plate, with the mold plate shown in transparent form to allow view of the features of the first cover plate below the mold plate.
Figure 4B:
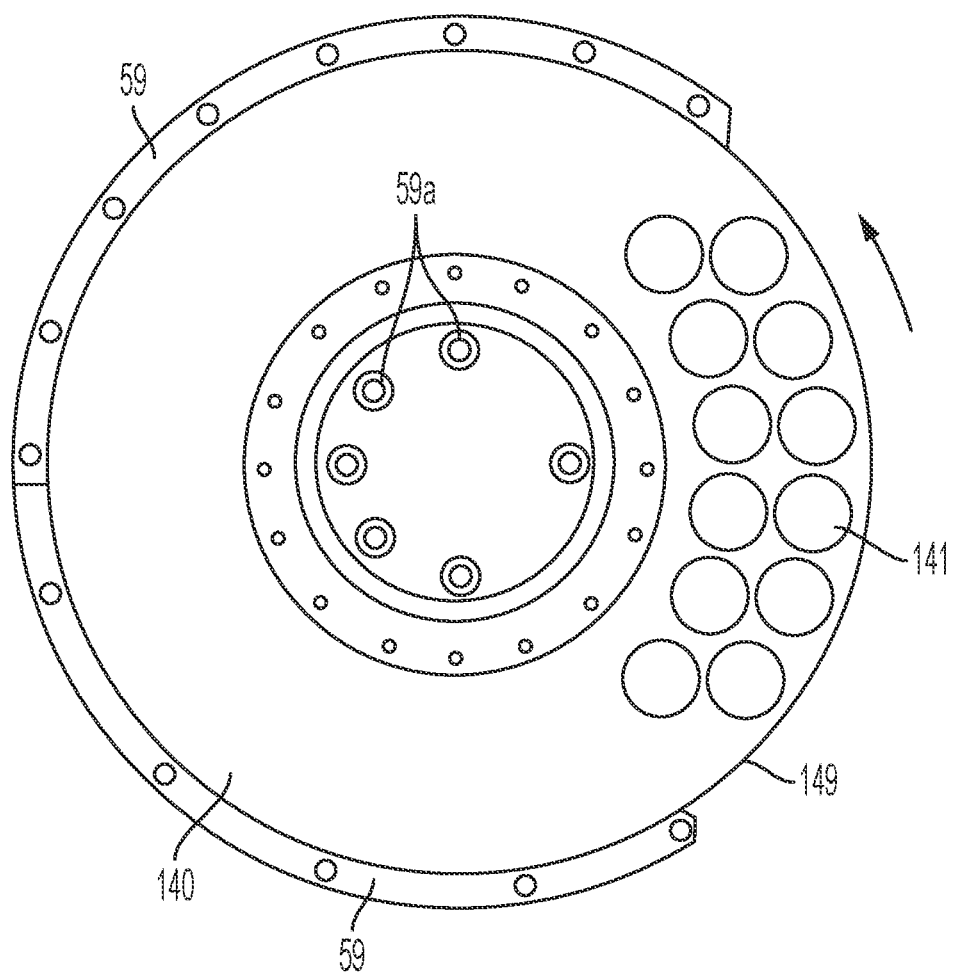
FIG. 4b is a top view of a mold plate, with the mold plate of the embodiment of FIG. 5 that depicts spacers positioned with respect to the mold plate, the relationship between the mold plate and the spacers depicted in the figure are applicable for all of the embodiments of this specification.

The mold plate 40 is supported by a first cover plate 60 that is provided below the mold plate 40. In some embodiments, there is direct contact between the mold plate 40 and the first cover plate 60, while in other embodiments the mold plate 40 does not directly contact the first cover plate 60. As best shown in FIGS. 4a and 4b, there is a spacer 59 is disposed just outboard of the outer edge 49 of the mold plate 40 (FIG. 4b is depicted with respect to mold plate 140 discussed below, but is equally applicable to mold plate 40 as well as the other mold plates disclosed herein). The thickness of the spacer 59 is just larger than the thickness of the mold plate 40 (such as on the order of several thousandths of an inch thicker—e.g. 0.002-0.005 inches thicker). The first and second cover plates 60, 70 rest upon the spacer 59 and therefore positions the covers with respect to the mold plate 40 so that the mold plate 40 does not contact the first and second cover plates 60, 70 as the mold plate 40 rotates. In some embodiments, the spacer may be made from the same or a similar material as the mold plate. The spacer 59 may be made from multiple pieces for ease of manufacturing as depicted in FIG. 4b.

The presence of small portions of the food product that is intended to be pumped into the voids 41 (discussed herein) but ends up between the surface of the mold plate and one of the two covers 60, 70 provides lubrication to allow the mold plate 40 to spin with respect to the covers 60, 70. In some embodiments as shown in FIG. 4b, a central spacer 59a (or a plurality of discrete central spacers) may be provided within a center hole of the mold plate, and may assist to maintain the gap between the mold plate (140 as in FIG. 4b, but also applicable to mold plate 40 and the other mold plates disclosed herein) and the covers 60, 70 at and proximate to the center of the mold plate 40.

The first cover plate 60 is fixed in place and may be supported by a stand 18 or a housing. The first cover plate is configured to cover a portion, and in some embodiments a majority, of the bottom surface 45 of the mold plate 40 for the purposes discussed herein. In some embodiments the first cover plate 60 is sized to not cover a portion of the mold plate 40 such that one or more voids 41 of the mold plate 40 are exposed below the mold plate 40 when the one or more voids 41 are aligned outside of first cover plate 60, as depicted in FIG. 4a with void 41' aligned outside of the first cover plate 60. In other embodiments disclosed below, the first cover plate 60 may be arranged with a cutout portion 68 that exposes one or more voids from the mold plate 40 when aligned with the cutout portion 68.

The second cover plate 70 is provided and extends above the upper surface 44 of the mold plate 40—to sandwich the mold plate 44 (with the first cover plate 60). The second cover plate 70 is aligned with minimal spacing with the mold plate 40, as set by the spacers 59/59a as discussed above, which minimizes the flowing food that flows between the mold plate 40 and the second cover plate 70. In some embodiments, a flexible boundary or spacer may be provided around each void 41 (or plurality of adjacent voids in embodiments discussed below) to minimize the leakage of food as the mold plate 40 rotates.

The second cover plate 70 may be sized and shaped similarly to the first cover plate 60 and is typically aligned with respect to the mold plate to expose one or more voids 41 from above the mold plate 40 as they are exposed below the mold plate 40, either based upon the geometry of the second cover plate 70 not covering some voids, or by the second cover plate 70 including a cutout 78, like and aligned with the cutout 68 of the first cover plate 60.

The first cover plate 60 further comprises first and second apertures 64, 66 that are aligned to interact with the voids 41 of the mold plate 40 as the voids rotate past the first and second apertures 64, 66. The first and second apertures 64, 66 may be aligned such that a center (which may be a geometric center) of the apertures are both aligned with the center 41a of each void 41 as the voids 41 rotate past the apertures. The apertures 64, 66 are provided to communicate within the respective void 41 that is aligned with therewith as the voids 41 move therepast. The first and second apertures 64, 66 are configured to be substantially covered by the mold plate 40 when the voids 41 are not aligned with the apertures 64, 66 during rotation of the mold plate as discussed below.

As the mold plate 40 rotates, a respective void 41 first encounters the first aperture 64 and then shortly thereafter encounters the second aperture 66.

The first aperture 64 is connected to a vacuum system 95 via a pipe to apply a vacuum force (N, FIG. 2) through the first aperture 64. When a void 41 is aligned with the first aperture 64, the vacuum force through the first aperture 64 evacuates air (and other gases when present) from the void 41. The close alignment between the bottom surface 45 of the mold plate 40 and the first cover plate 60 as well as the presence of the spacers 59 when provided, minimizes the space in existence proximate to the mold plate 40 and neighboring the void 41 such that as the mold plate 40 rotates thereby minimizing and ultimately eliminating the alignment between the first aperture 64 and the void 41 there is little time and little air proximate to the respective void 41 such that the void retains a portion of its evacuated status after leaving alignment with the first aperture 64.

The second aperture 66 is fluidly connected to a source of flowing food (M, FIG. 2) to be portioned by the system. In some embodiments, the flowing food is pumped to the second aperture 66 through a piping system 90 by a pump such as a positive displacement pump, which provides a relatively steady flow of food toward the second aperture 66 regardless of the backpressure provided to the pump.

As best understood with review of FIG. 4, when a void 41 is aligned with the second aperture 66, food flows into the respective void 41. Preferably the flowing food is processed (temperature, density of the flowing food and discharge pressure of the pump) so that food that flows into the aligned void 41 will very quickly fill up the geometry of the void 41 during the time that the void 41 is aligned with the second aperture 66. As the void 41 passes by the second aperture 66, the engagement between the trailing edge 41b of the void 41 (between the void 41 and the upper surface 44 of the mold plate 40) cuts off the flow of food, and due to the close proximity between the first cover plate 60 and the upper surface 44 of the mold plate 40 the flow of food is substantially prevented from flowing through the second aperture 66 until another void 41 becomes aligned with the second aperture 66. The presence of a relatively low pressure within the void 41 as it approaches the second aperture 66, as discussed above, increases the speed (and minimizes the waste) of food entering into the aligned void 41 because the food entering the void does not need to push a significant amount of air out of the void 41.

With continued rotation of the mold plate 40, the food patty that has been formed with in the void 41 approaches a position outside of the first cover plate 60 and the second cover plate 70 (some embodiments, like FIGS. 4-4a) or in other embodiments approaches the cutout 68 of the first cover plate 60 and the second cover plate 70 (embodiments discussed below).

Figure 1A:
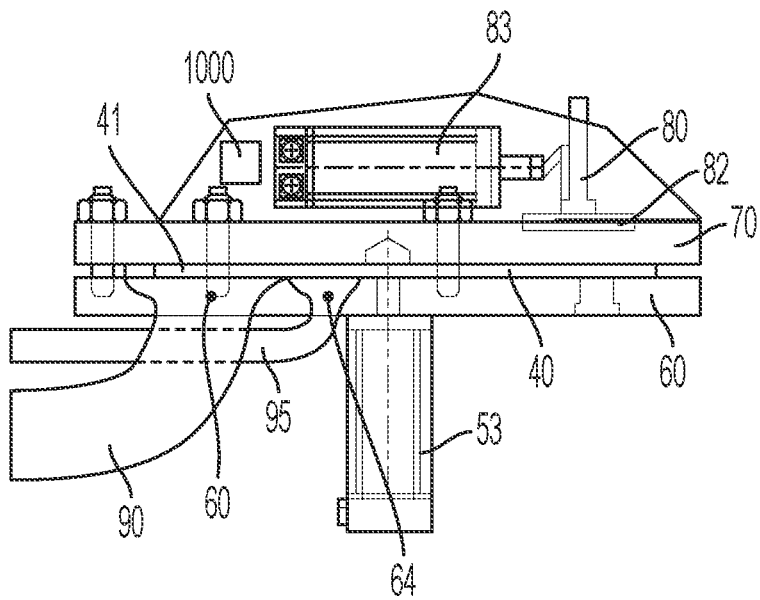
FIG. 1a is the view of FIG. 1 with knockout assembly in the withdrawn position.
Figure 2:
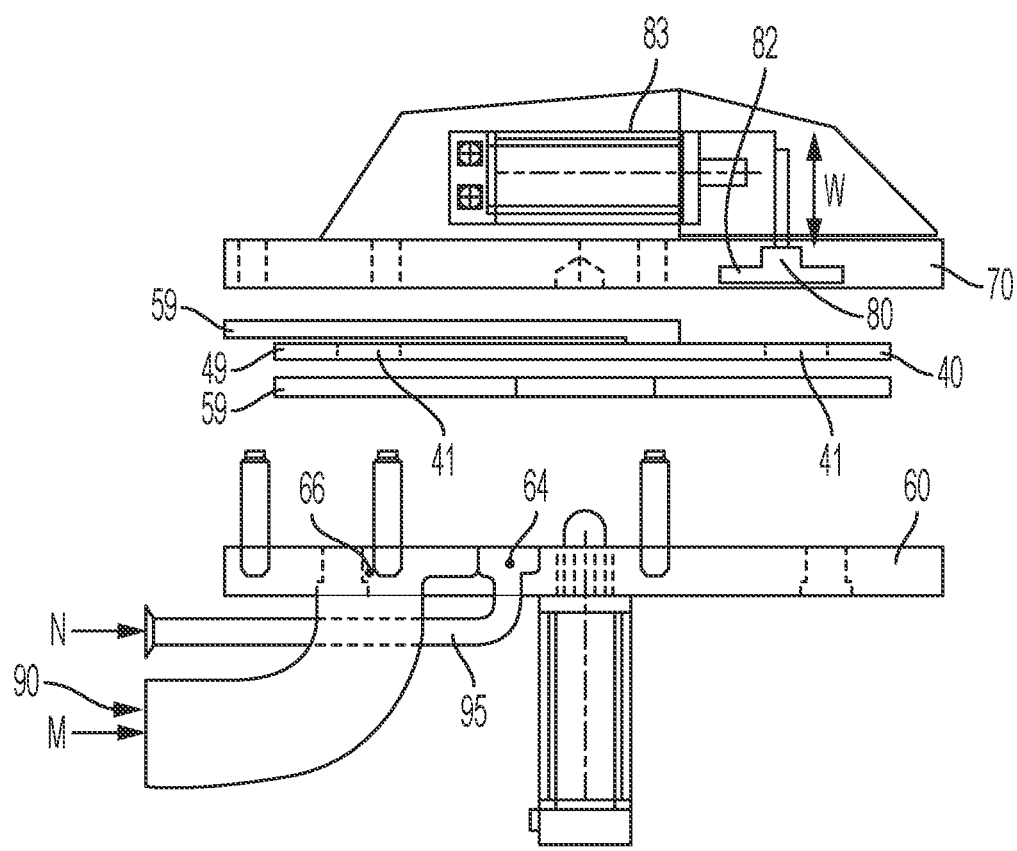
FIG. 2 is an exploded view of the components of the system of FIG. 1.

A knockout system 80 is provided and is aligned to interact with voids 41 within the mold plate 40 that rotate outside of the cover plates 60, 70 or within the cutouts 68, 78. The knockout system 80 is adapted to engage (directly or indirectly) the food patty within a void 41 that is aligned with the knockout system and urge the food patty downward and out of the void 41 and onto a conveyor, a tray, or other structure adapted to receive the food patty for further processing, packaging, or cooking. The knockout system 80 may include a moving mechanism 83 that supports a knock out cup 82 that reciprocates (directions G, FIG. 1) between an engaged position (FIG. 1) and a withdrawn position (FIG. 1a).

In the engaged position, the knock out cup 82 is translation to a position that is in close proximity to the upper surface 45 of the molding plate 40 and in some embodiments below the upper surface of the molding plate so that a portion of the knock out cup 82 extends into a void 41 that is aligned with the knock out cup 82 when in a rotational position to be aligned therewith. The engagement between the knock out cup 82 and the food patty within the void 41 imparts a downward force upon the food patty, which causes the food patty to exit the void 41 and fall downwardly from the mold plate 40. In one embodiment, the travel of the knock out cup in the engaged position is such that the bottom surface of the knockout cup makes contact with the food patty, thereby directly imparting a downward force directly upon the food patty. In another embodiment, the knock out cup 82 does not extend into the void a where the bottom surface 82 of the knock out cup engages the food patty disposed within the void 41 to urge the food patty downwardly out of the void 41 (through the surface of the void 41 created by the bottom surface 46 of the mold plate 40) and instead a positive pressure above the food patty is created that acts downwardly upon the top surface of the food patty—thereby creating a downward force upon the patty to cause it to slide downwardly with in the void 41 and out of the mold plate 41.

When in the withdrawn position, the knockout cup 82 is withdrawn a distance away from the mold plate 40 to allow the mold plate 40 to rotate without interference from the knockout cup 82. The controller 1000 is adapted to control the reciprocating movement between the engaged and withdrawn positions with timing such that the knockout cup 82 travels toward a void 41 when the mold plate 40 is in a rotational position such that a void 41 that contains a food patty is aligned with the knock out cup 82—and specifically that they are aligned when the knockout cup 82 reaches the engaged position. One of ordinary skill in the art with a thorough review and comprehension of this disclosure would be able to design and assembly a knockout system 80 and the controlled rotation of the mold plate 40 to allow for knockout cup reciprocation to the engaged position in time with a void reaching alignment with the knockout cup with only routine optimization.

The knockout system 80 may be a system that moves the knockout cup 82 linearly between the engaged and withdrawn positions, or the knockout cup 82 may move through an arc. The knockout system 80 may move by a linear actuator, or through a transmission via a motor. In some embodiments, the movement of the knockout system may be in response to a measured rotational position of the molding plate 40 such as measured with an encoder that is provided upon the shaft that provides torque to rotate the molding plate 40, or an encoder may be positioned to indirectly measure molding plate 40 rotational position such as by monitoring shaft position within a transmission associated with the molding plate 40 (55, FIG. 3A schematic). In these embodiments, the molding plate 40 position is sent to a controller, which with knowledge of the design speed of the molding plate 40 at various positions of the molding plate 40 can determine when the knockout system 80 needs to operate to align the knockout cup 82 with a void in the engaged position.

In the embodiments depicted in FIGS. 1-4a, a single void 40 is aligned at a position to interact with the knockout system 80 at a time and therefore the knockout system includes a single knockout cup 82. In other embodiments discussed below, a plurality of voids are provided in a close arrangement, which collectively will be proximate to the knockout system 80 at a time (and either within the space formed by the cutouts 68, 78, or outside of the boundaries of the first and second cover plates 60, 70 discussed above. As discussed in further detail below, in these embodiments, the knockout system 80 includes a plurality of knockout cups that move in unison with movement between the engaged and the withdrawn positions. In some embodiments, the each of the plurality of knockout cups are arranged to be aligned with a respective one of the plurality of voids 41 when in the engaged position. Alternatively, the knockout system 80 may have one or several knockout assemblies where each assembly is in registry with several voids 41 and can cause the food patty within several voids to fall downwardly out of the voids 41 and the mold plate 40.

In some embodiments, the mold plate 40 is rotated at different speeds (such as a relatively slow speed and a relatively fast speed) depending upon the rotational position of the mold plate 40, and specifically depending upon the position of the voids 41 of the mold plate 40 with respect to the first and second apertures 64, 66 of the first cover plate 60 and with respect to the uncovered portion (either the edge or the cutouts 68/78). In some embodiments, the mold plate 40 may rotate a first relatively slow speed within a void 41 is proximate to and moving across the first and second apertures 64, 66 of the first cover plate 60 and when a void 41 that is filled with a food patty moves through the uncovered portion to interact with the knockout system 80. When the mold plate 40 is at rotational positions where neither of these occurring the mold plate 40 may be rotated at a faster speed until the mold plate 40 approaches a position where the voids are proximate to the first and second apertures 64, 66 and the uncovered portion. In some embodiments, such as the embodiments described above and depicted in FIGS. 3-4a the mold plate 40 is arranged with voids 41 disposed at consistent spacing around the mold plate 40. In these embodiments, the mold plate 40 may be rotated at a constant speed.

Figure 5:
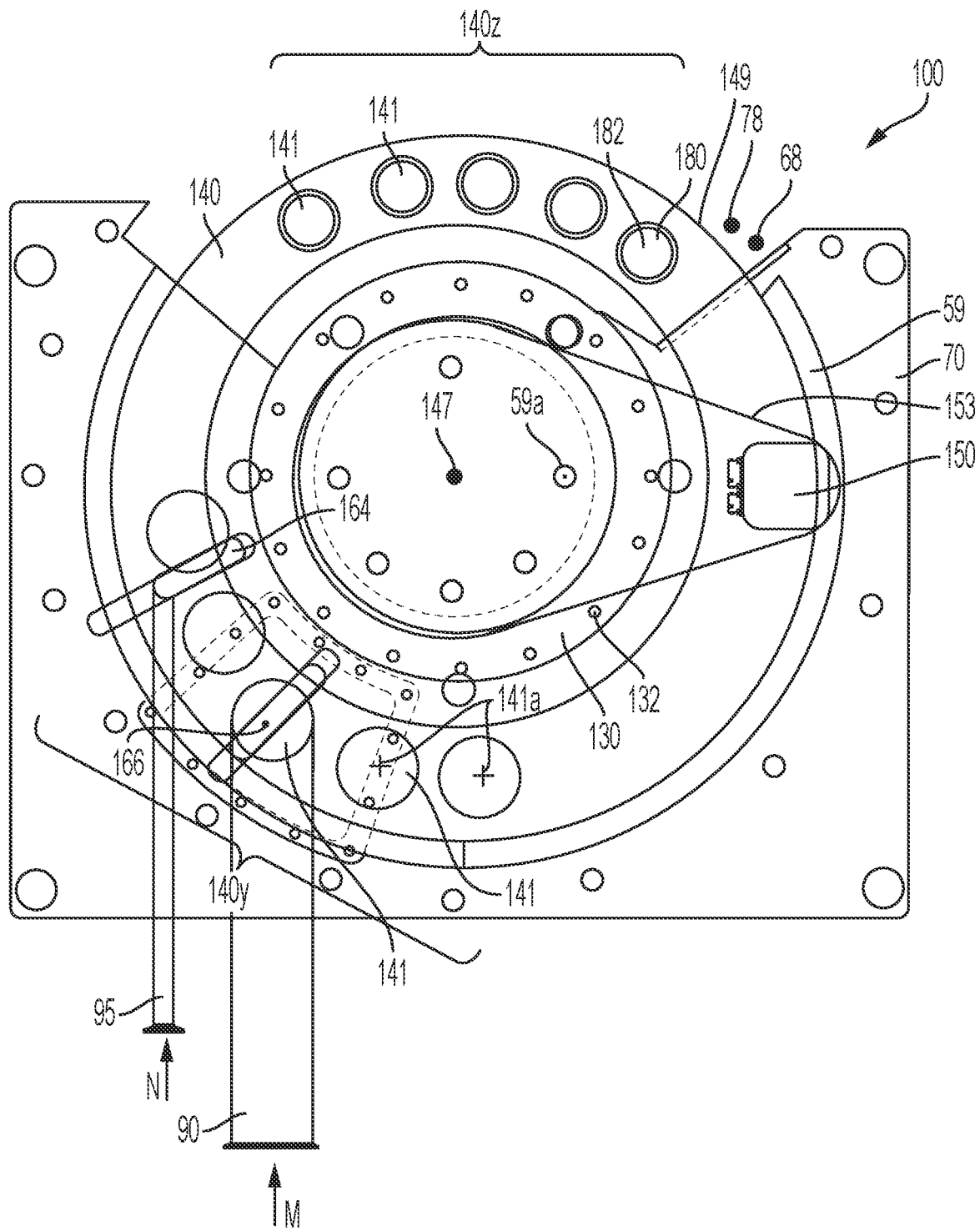
FIG. 5 is a top view of another system to rapidly form food patties using a rotating mold plate, with the second cover plate removed and without the knockout assembly.

Turning now to FIG. 5, another representative embodiment of the disclosure is provided. The embodiment includes a system 100 that is configured to place a plurality of formed food products at the same time. The system 200 is very similar to the system 100 discussed above, and the discussion of system 100 is incorporated by reference into system 200 with the specific differences in systems identified herein. The system includes a mold plate 140 that includes one or two sets 140z, 140y of voids 140. In some embodiments, the mold plate 140 may include a single set 140z of voids, while in another embodiment, the mold plate 140 may two sets 140z, 140y of voids 140. While FIG. 5 is drawn with both of the two sets of voids 140z, 140y, the mold plate with only the first set of voids 140z would be the same as with the mold plate 140 depicted in FIG. 5 only without the voids within the second set 140, and instead a flat plate at those locations upon the mold plate 140.

Each set of voids 140z, 140y are provided with a plurality of voids 140 that are arranged proximate to each other and such that all of the voids within the respective set will be within the cutouts 168, 178 of the respective first and second plates 160, 170 at the same time, to allow, in some embodiments, for the knockout assembly 180 to interact with all of the voids 141 within the set at the same time so that the food patties that are removed from the voids 141 will be deposited upon the conveyor (or other desired location) at the same time, with a single linear stroke of the knockout assembly 180 from the withdrawn position to the engaged position (similar to the motion of the knockout assembly 80 as depicted herein). The sets of voids 140z, 140y are depicted as including 5 voids in each set, but these numbers of voids per set can vary such as including 2, 3, 4, 6, or 7 voids per set (or other numbers of voids 141 that would be possible to fit onto the mold plate from a design perspective—and from the perspective of the design of the knockout system 180, as discussed below.

In this embodiment, the voids 141 within a (or each) given set 140z, 140y are disposed at consistent positions upon the mold plate 140, such as with a center 141a of each void located at the same radius from the centerpoint 147 of the mold plate and the centers 141a of each void spaced at a consistent arc length from the centers 141a of adjacent voids. This arrangement is provided, such that all voids 141 interact with the first and second apertures 164, 166 at consistent positions as they pass over the first and second apertures 164, 166. The first and second apertures 164, 166 operate with respect to the voids 141 in the mold plate 140 in the same manner that apertures 64, 66 operate with respect to the voids 41 in the mold plate 40 as discussed in the embodiments above.

In other embodiments, the knockout assembly 180 is configured to include a single knockout cup 182 that interacts with each void 141 within the same plurality of voids in a rapid fashion while each void 141 within the plurality of voids passes below the cup 182. In this embodiment, the food patties from the set of voids 141 are removed from the mold plate 140 in a rapid and iterative manner.

The system 100 includes the features of system 10 discussed above, including the mold plate 140, the first and second cover plates 160, 170, the knockout assembly 180 and is configured to receive suction through a first aperture 164 in the first cover plate 160 from a vacuum source 95, and a flow of food product from a food product pumping system 90.

In the embodiment of FIG. 5, the system 100 operates to rotate the mold plate 140 at differing speeds depending upon the rotational position of the plate 140. When the plate is a position (as shown in FIG. 5) when one of the sets 141z or 141y is aligned with the holes 164, 166 in the first cover plate 160, or one of the sets 141z, 141y is aligned with the cutout 168, 178 the mold plate is rotated at a relatively slow velocity. When the mold plate 140 is rotated in a position where the last void within each set passes the second aperture 166, and after the set of voids disposed within the cutout 168, 178 has already been acted upon by the knockout system 180 moving the knockout cups 182 into the engaged position to force the food patties out of each of the voids 141 within the aligned set of voids 141z, 141y, the mold plate 140 is rotated at a much faster speed for an arc length until the first void 141 from the next set of voids approaches the first hole 164, whereby the rotational speed of the mold plate 140 is again slowed down to the slower speed—to be evacuated and then filled with food via the first and second holes 164, 166 and to be acted upon by the knockout system 180 per the alignment of the mold plate 140. As with the other embodiments, the controller 1000 causes rotation of the mold plate 140 (at the appropriate speed as discussed above) with knowledge of the position of the mold plate, such as from a signal provided by an encoder that can monitor the position of the direct shaft that rotates the mold plate 140, or in other embodiments calibrated based upon the position of other components in the transmission (52 all embodiments), or even the output shaft position of a servomotor 50 (all embodiments) that generates torque to ultimately rotate the mold plate 140.

In this embodiment and in other embodiments unless specified with respect to those embodiments, the position of the knockout assembly 180 is monitored with an encoder that monitors the position of a direct drive shaft or a shaft within a transmission of the assembly, or a position of a linear actuator. The controller uses these position signals to control the operation of the mold plate 140 and the knockout assembly for precise timing. In some embodiments, the knockout assembly 180 can move at varying speeds, a slow speed early in the travel from the withdrawn position toward the engaged position, and then a much faster speed as the knockout cups 182 travel to the engaged position and withdraw from the engaged position. This varying speed has the benefits of providing fast motion toward and withdrawal from the voids 141 (set of voids 140z, 140y, or a single void 40 as discussed above) due to the short time that the voids are properly aligned with the knockout cup 182, and to generate a large pressure as the bottom of the knockout cups 182 approach the food patty—and in embodiments where the knockout cups 182 contact the food patties a large force applied to the food patties. The slow velocity of the knockout assembly 180 in other positions allows for precise positioning, is allowable due to the relatively long time between intervals where a set of voids is in registry with the knockout system (or single void is in registry as discussed above), may minimize the design constraints on the system that might be applicable if the knockout assembly 180 constantly moved at the fast speed.

The mold plate 140 has an arcuate outer edge 149, and is preferably circular but can be in other shapes as desired. The mold plate has a center 147, that forms the axis of rotation. In some embodiments, the mold plate 140 extends to the center 147, while in other embodiments the center 147 of the mold plate is the geometric center and axis of rotation but is within an empty central portion of the mold plate 140.

Figure 6:
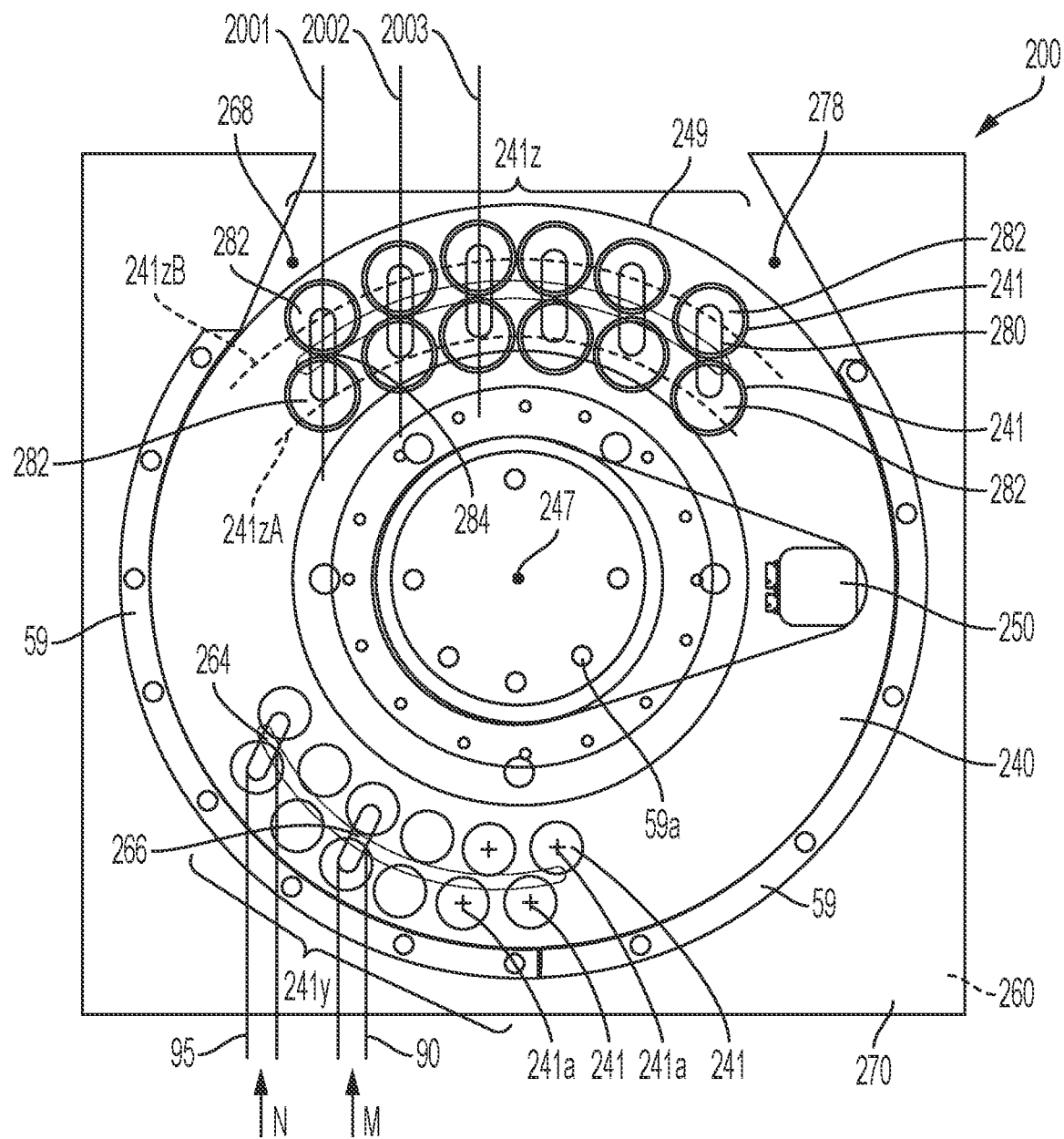
FIG. 6 is a top view of another system to rapidly form food patties using a rotating mold plate, with the second cover plate removed and portions of the mold plate shown in transparent form to allow view of various features of the first cover plate below the mold plate.

Turning now to FIG. 6, another embodiment of the system 200 is provided. The system 200 is very similar to the system 100 discussed above, and the discussion of system 100 is incorporated by reference into system 200 with the specific differences in systems identified herein. The mold plate 240 and the knockout assembly 280 are modified herein as discussed. The mold plate 240 is provided with both first and second sets 241$z$, 241$y$ of voids, or in other embodiments only the first set 241$z$ of a plurality of voids 241 (like FIG. 6 although the mold plate 240 is continuous at the locations where the second set 241$y$ are drawn). The first set of voids 241$z$ and when provided the second set 241$y$ of voids is arranged with two rows of voids that are aligned such that all of the voids within a first row e.g. 240$z$A are aligned with centers 241$a$ that are at a first radius from a center of the mold plate, and all of the voids within a second row e.g. 240$z$B are aligned with centers 241$a$ that are at a second, larger, radius from the center of the mold plate.

In some embodiments, similar to the system 100, all of the voids within the same row (e.g. 241$z$A) are arranged with a consistent spacing between the centers 241$a$ of adjacent voids. In some embodiments, the voids from neighboring rows (241$z$A and 241$z$B) are formed where one void from each row is aligned with a void from the adjacent row to form a line (e.g. line 2001 on FIG. 6) and all of the voids are aligned in this manner such that each void 241 is positioned with its center extending in a line through a center 241$a$ of a void in the other row—and all of the lines are parallel with each other with the specific set of voids 240$z$, 240$y$ (as depicted with lines 2001, 2002, 2003 in FIG. 6). There are various benefits to this arrangement, such as aligning neighboring voids 241 along the same row to be spaced at the same distance apart in both rows, as well as to maintain the spacing of all of the voids within a set in a compact manner to simplify the operation and the design of the knockout system 280, such as to allow the patties from all of the voids within a set to be removed with motion of the knockout assembly 280 in a single stroke, or in other embodiments in a minimum number of strokes. The compact placement of all of the voids 241 within a set also allows the space of the cutouts 268, 278 to be minimized.

FIG. 6 depicts the plurality of knock out cups 282 aligned with the plurality of voids 241 that are disposed in registry with the cutout portions 268, 278 so that when the knock out assembly 280 transitions to the engaged position the knock out cups 282 interact with the food patties within the respective voids 241 to cause each food patty to fall from the void 241. FIG. 6 depicts pairs of knock out cups 282 that are aligned with adjacent voids from the two rows are constrained together with a bar 284. As discussed herein the knock out assembly may move all knock out cups 282 simultaneously, or for example, the knock out assembly 280 may move adjacent knock out cups that are connected with bars at the same time and in a cyclic fashion along the two rows so that adjacent food patties within the same row are ejected in a one after the other fashion.

In other embodiments, neighboring voids 241 from the two different rows may be disposed along the same line that extends to the geometric center point of the mold plate 240. This may be preferred because it allows the neighboring voids 241 from the two different rows to approach the first and second holes 264, 266 at the same time in embodiments where the holes 264, 266 each extend in a direction toward the geometric center point of the mold plate 240. The plurality of voids 241 may be arranged differently in order to obtain different spacing of the food patties that fall from the mold plate 240 to a conveyor 2000 below or for similar purposes.

Figure 7:
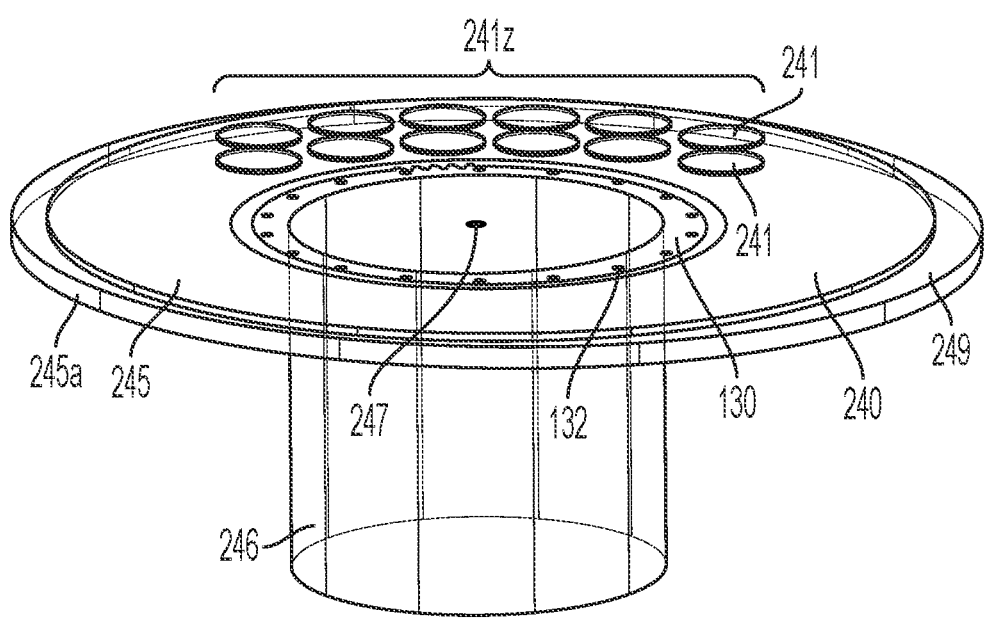
FIG. 7 is a perspective view of a mold plate usable with the system of FIG. 6 depicting the mold plate with a single set of apertures.

FIG. 7 is a perspective view of a mold plate 240 that is usable with the system 200. As depicted, the mold plate 240 includes a flat surface that includes the plurality of voids 241, and a transmission surface 246. The transmission surface 246 may receive a belt 52 that is spun by a motor 53. The transmission surface 246 may receive torque to cause the mold plate 240 to rotate via other transmission members, such as direct drive, gear drive, or the like. In some embodiments the transmission surface 246 (which may be a hub 246 is connected to the mold plate 240 with a plurality of pins 132 to transfer torque between the hub 246 and the mold plate 240. In those embodiments, a seal ring 130 may be provided upon the mold plate to cover the pins 132. This structure depicted in FIG. 7 may be used for all of the mold plates disclosed herein. In other embodiments the mold plate may be directly rotated by a motor as depicted in FIG. 8.

The mold plate 240 has an arcuate outer edge 249, and is preferably circular but can be in other shapes as desired. The mold plate has a center 247, that forms the axis of rotation. In some embodiments, the mold plate 240 extends to the center 247, while in other embodiments the center 247 of the mold plate is the geometric center and axis of rotation but is within an empty central portion of the mold plate 240.

Figure 8:
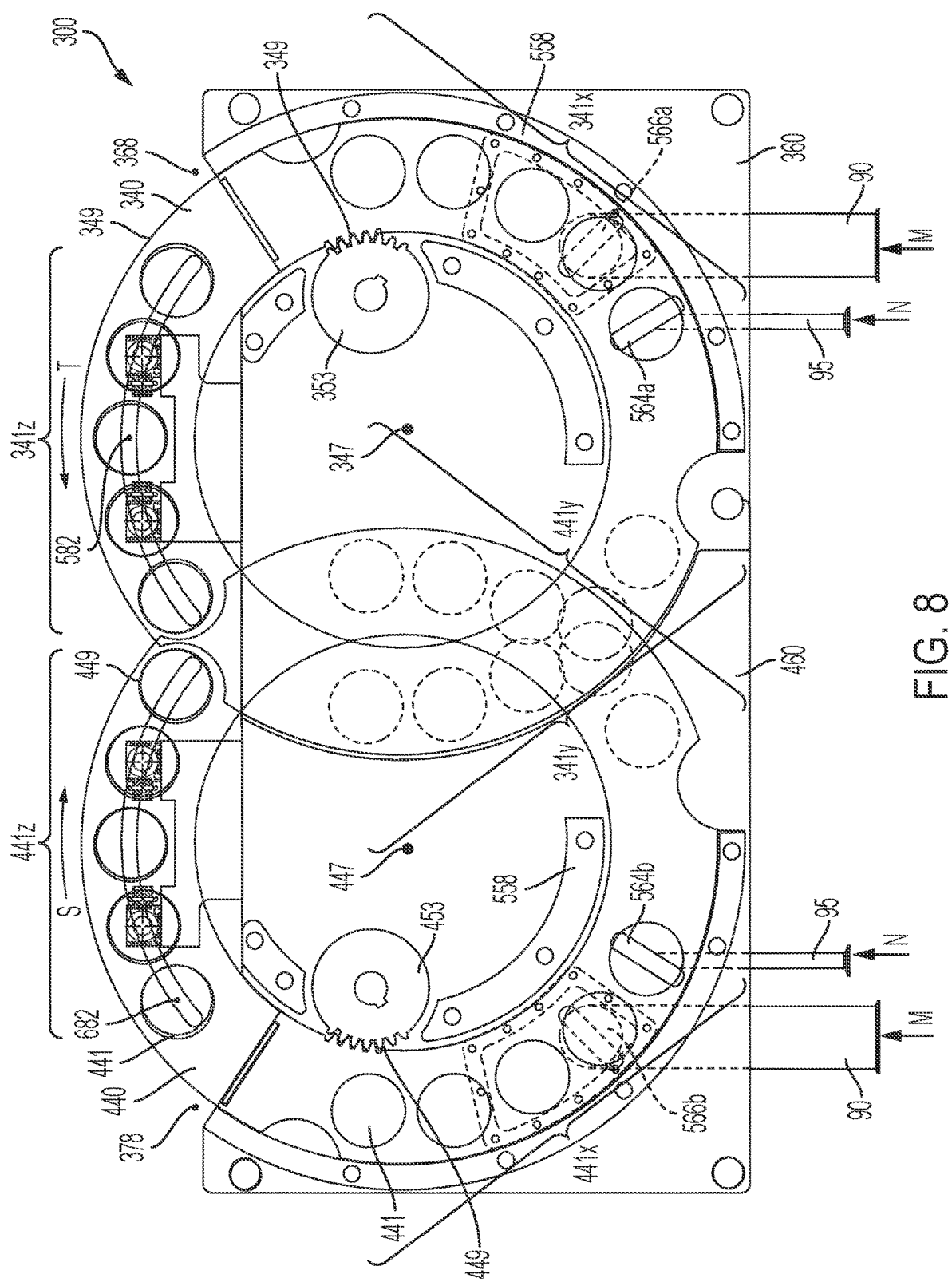
FIG. 8 is a s a top view of another system to rapidly form food patties using two rotating mold plates, with the second cover plate removed and portions of the mold plates shown in transparent form to allow view of various features of the mold plate below the other mold plate and first cover plate below the mold plates.
Figure 9:
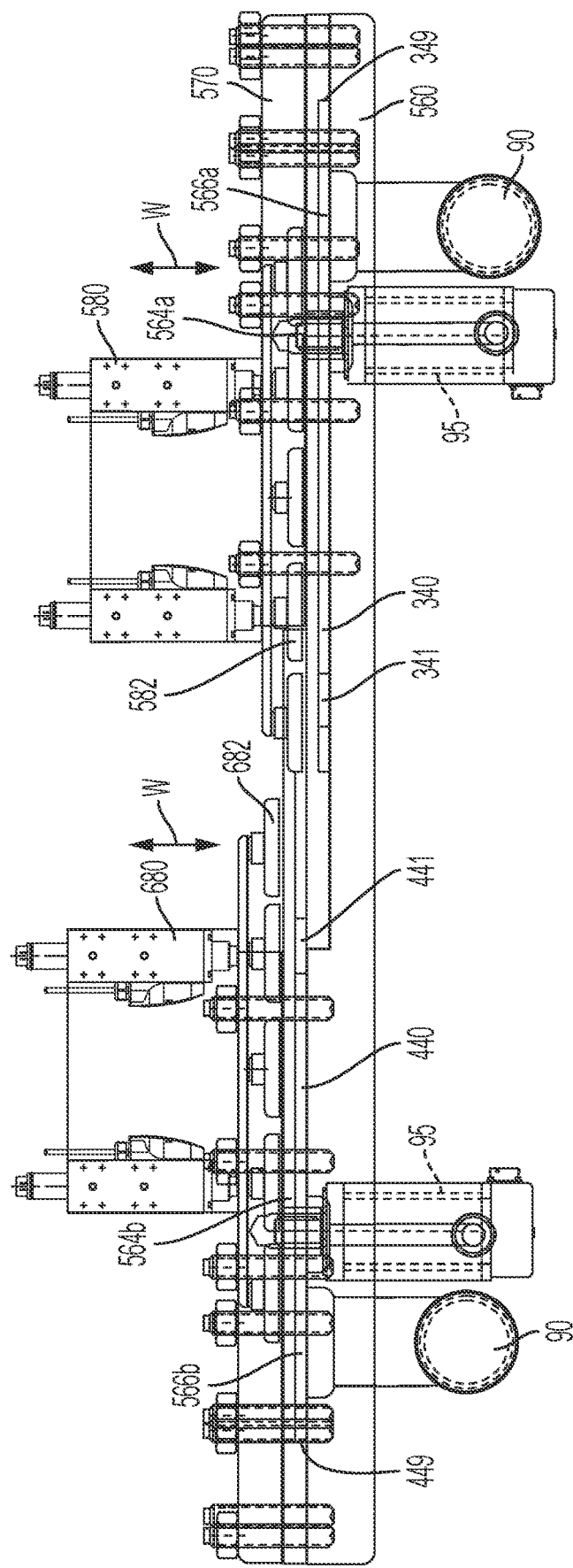
FIG. 9 is a side view of the system of FIG. 8 with portions of the first and second plates shown in transparent view to show the mold plates and the knockout assembly.

Turning now to FIGS. 8-9, another system 300 is provided. The system 300 differs from the prior systems discussed herein in that the system 300 includes mold plates, mold plate 340 and mold plate 440 that rotate simultaneously, and in some embodiments opposite directions T and S, respectively. The mold plates 340 and 440 may be arranged to be positioned above a single first cover plate 560, or in other embodiments two cover plates. In the embodiments depicted in FIGS. 8 and 9 portions of the mold plates 340, 440 may vertically overlap each other in order to minimize the footprint of the system 300 and to allow for the food patties to be ejected from the plurality of voids 341, 441 simultaneously (or in a short time frame).

In embodiments where portions of the mold plates 340, 440 overlap, the vertically overlapping portions are preferably portions that have already had their food patties to drop out and before they are again filled with new food patties. Specifically, the portions of the mold plates 340, 440 that overlap are not constrained closely by the combination of the first and second cover plates 560, 570 and the spacers 558. The portions of the plates 340, 440 that have spun past vertical alignment with the other mold plate then are enclosed by the first and second cover plates 560, 570 and the spacers 558 to allow a vacuum to be drawn within the voids 341, 441 after while rotating past the first apertures 564$a$, 564$b$ aligned to apply suction to the voids 341, 441 in each mold plate (as discussed above with respect to other embodiments described herein), and to enclose the flowing food that enters the void 341, 441 from the second aligned second apertures 566$a$, 566$b$.

As depicted in FIGS. 8 and 9, the mold plates 330, 340 may each include three sets of voids—plate 340-341$z$, 341$y$, 341$x$, and plate 440-441$z$, 441$y$, 441$x$. As depicted, in this embodiment, the sets 341$z$ and 441$z$ are both aligned to be simultaneously (or nearly simultaneously) engaged by a knockout assembly—580 associated with the voids 341 from the first mold plate and 680 associated with the voids 441 from the second mold plate. The two knockout assemblies 580, 680 may operate simultaneously or with short delay between each other, and the two knockout assemblies 580, 680 may be operated by the same motor (or linear actuator) either direct or through a transmission, or each knockout assembly by different dedicated motors (linear actuator) either direct or through transmissions.

As discussed above, the second sets of voids $341y$, $441y$, may be positioned vertically aligned with each other (or vertically crossing each other) and in the rotational position as depicted in FIG. 8 the second set of voids $341y$, $441y$ do not include food therein and are not closely constrained by the first and second cover plates 560, 570 and spacers. The third set of voids $341x$, $441x$ are positioned to interact with the dedicated first and second apertures 564a, 564b and 566a, 566b for drawing a vacuum and then filling the voids 341, 441 passing thereover with flowable food. As can be understood, because both mold plates 340, 440 rotate, a specific void 341, 441 will rotate through positions were it is set z, y and x depending upon the rotational position of the specific void within the mold plate.

The mold plates 340, 440 each have an arcuate outer edge 349, 449, and are each preferably circular but can be in other shapes as desired. Each mold plate has a center 347, 447, that forms the axis of rotation. In some embodiments, the mold plate 340, 440 extends to the center 347, 447, while in other embodiments the center 347, 447 of the mold plate is the geometric center and axis of rotation but is within an empty central portion of the mold plate 340, 440.

As depicted in FIG. 8, the first and second mold plates 340, 440 may be rotated by a motor that engages with the respective mold plate via a transmission. In the embodiment of FIG. 8, the motor drives a gear 353, 453 that engages with corresponding gear teeth 349, 449 formed in the inner surface of each mold plate 340, 440 such that rotation of the motor causes rotation of the gear and therefore rotation of the toothed mold plate. This type of internal gear system may be applied to the systems 10, 100, 200 discussed above.

In each of the embodiments of systems 10, 100, 200, 300 discussed herein, the voids (e.g. 40) are depicted and described as circular with a center (41a) at the geometric center of the circular void. In other embodiments, not shown but would be readily understood by one of ordinary skill in the art with a thorough review and understanding of this specification, the voids within a given mold plate may be other shapes than circular, such as rectangular, triangular, oval or elliptical or other arbitrary shapes. In these embodiments, these voids would include a center that is defined as a consistent location within all the open volume of all voids within a given plate that is at or proximate to a position that is half or about half of the width of the void and at half or about half of the height of the void (as width and height are measured in directions parallel to the upper surface of the mold plate. In these embodiments the voids would be arranged upon the mold plate so that each void approaches the first and second apertures (e.g. 64, 66 of the first cover plate 60) at the same position and so that the voids are all aligned in the same manner when outside of the first and second cover plates or within the cutouts (e.g. 68, 78) so that the voids are consistently interacted upon by the knockout assembly. In these embodiments with non-circular voids, the noncircular void has a "diameter" which is in reference to a largest linear dimension of the opening formed by the void upon the surface of the mold plate. As can be understood by one of ordinary skill in the art with a thorough review of this specification, in situations where the voids are non-circular, the voids should be arranged upon the mold plate so that the voids are in fully or as complete registry as possible with the second apertures upon the first cover plate to facilitate flow of flowing food into the aligned void and for the flowing food to completely fill the open volume of the aligned void during the time that the void passes over and by the second aperture.

The term "about" is specifically defined herein to include a range that includes the reference value and plus or minus 5% of the reference value. The term "substantially the same" is satisfied when the width of the end surfaces of the holes are both within the above range. In embodiments where the holes 52 within the plate are not round, the dimensions listed above refer to a major dimension of the hole (such as a width of a rectangular or square hole, or a median cross-sectional distance of a curved, but not round, or an arbitrarily shaped hole).

While the preferred embodiments of the disclosed have been described, it should be understood that the invention is not so limited and modifications may be made without departing from the disclosure. The scope of the disclosure is defined by the appended claims, and all devices that come within the meaning of the claims, either literally or by equivalence, are intended to be embraced therein.

The specification as contemplated by the applicant can be best understood with reference to the following representative paragraphs:

Representative Paragraph 1: An apparatus for preparing a plurality of uniformly formed food products, comprising:
   a mold plate with a plurality of voids disposed therein, the mold plate comprising a center and an arcuate outer edge, the mold plate is rotatable about the center;
   the plurality of voids collectively organized into a first set and a second set, the plurality of voids within the first set disposed with a consistent spacing between adjacent voids and the plurality of voids arranged within the second set disposed with a consistent spacing between adjacent voids, wherein a void at an end of the arranged voids of the first set is further from the closest void within the second set than a spacing of adjacent voids within the first set and a spacing of adjacent voids within the second set, wherein no voids are located within the mold plate between the voids of the first set and the voids of the second set,
   a transmission disposed in conjunction with the mold plate to transfer torque to the mold plate to cause the mold plate to rotate about the center of the mold plate;
   a first cover plate fixed with the mold plate rotatable about the first cover plate, the first cover plate disposed in parallel to the mold plate, a first aperture disposed through the first cover plate and a second aperture disposed through the first cover plate, wherein each void of the plurality of voids of the mold plate is aligned sequentially with the first aperture and then aligned with the second aperture as the mold plate is rotated about its center, the first cover plate defining an empty space that exposes an arc length of the mold plate as the mold plate rotates and covering a remaining portion of the mold plate or the dimensions of the first cover plate are such that a portion of the mold plate with the plurality of voids extend outside of the first cover plate;
   a knock-out assembly disposed with respect to the empty space to interact with the mold plate that is disposed in registry with the empty space of the first cover plate or the knock-out assembly is disposed outside of the first cover plate, wherein the knockout assembly interacts with voids disposed within the empty space or outside of the first cover plate;
   a filling system disposed in registry with the second aperture of the first cover plate to direct a flow of food product through the second aperture and into one or more voids of the mold plate that are disposed in registry with the second aperture.

Representative Paragraph 2: The apparatus of Representative Paragraph 1, further comprising a vacuum system fixed to the first cover plate and in registry with the first aperture such that vacuum force from the vacuum system extends through the first aperture and into one or more voids that are in registry with the first aperture.

Representative Paragraph 3: The apparatus of any one of Representative Paragraphs 1-2, further comprising a conveyor disposed below the empty space in the first cover plate or outside of the first cover plate.

Representative Paragraph 4: The apparatus of any one of Representative Paragraphs 1-3, further comprising a drive shaft that extends from the mold plate, wherein the transmission interacts with the drive shaft to cause the mold plate to rotate about the center of the mold plate.

Representative Paragraph 5: The apparatus of any one of Representative Paragraphs 1-4, wherein the knock-out assembly comprises a plurality of knock-out cups that are disposed in registry with the empty space in the first cover plate or outside of the first cover plate.

Representative Paragraph 6: The apparatus of Representative Paragraph 5, wherein each of the plurality of knock-out cups translate linearly in unison between a withdrawn position and an engaged position, wherein in the withdrawn position the plurality of knock-out cups are disposed away from the mold plate and wherein in the engaged position the plurality of knockout cups extend to a position proximate to or within aligned voids of the mold plate.

Representative Paragraph 7: The apparatus of Representative Paragraph 6, wherein each of the plurality of knock-out cups are disposed in registry with one of the plurality of voids of the mold plate that are disposed within the empty space of the first cover plate or outside of the first cover plate when the plurality of knock-out cups are translated to the engaged position such that bottom surfaces of each of the plurality of knock-out cups contact food product disposed within the void in registry with the knock-out cup, which urges food product within the respective void out of the void to fall away from the mold plate.

Representative Paragraph 8: The apparatus of Representative Paragraph 6, wherein each of the plurality of knock-out cups are disposed in registry with one of the first or second plurality of voids of the mold plate when the plurality of knockout cups are translated to the engaged position, wherein a portion of each knock-out cup extends within a respective void, which applies a force to the food product disposed within the respective void, which urges the food product out of the void to fall away from the mold plate.

Representative Paragraph 9: The apparatus of any one of Representative Paragraphs 1-8, further comprising a spacer that is fixed to the first cover plate and extends outside the outer edge of the mold plate.

Representative Paragraph 10: The apparatus of any one of Representative Paragraphs 1-9, wherein the mold plate is circular.

Representative Paragraph 11: The apparatus of any one of Representative Paragraphs 1-10, wherein the plurality of voids within the first set include first and second rows of voids and the plurality of voids within the second set include first and second rows of voids, wherein each of the voids of the row of voids of both of the respective first and second sets of voids are aligned along a first arcuate line with a first constant radius, and each of the voids of the second row of voids of both of the respective first and second sets of voids are each aligned along a second arcuate line with a second constant radius that is smaller than the first constant radius.

Representative Paragraph 12: The apparatus of Representative Paragraph 11, wherein centers of the plurality of voids of each of the first and second rows are spaced a distance greater from the centers of adjacent voids than a diameter of each of the plurality of voids.

Representative Paragraph 13: The apparatus of Representative Paragraph 11, wherein each of the first and second rows include the same number of the plurality of voids, wherein each void disposed along the first row is aligned with a radial line through the center of the respective void, wherein the radial line extends through the center of a void disposed within the second row of the plurality of voids.

Representative Paragraph 14: The apparatus of any one of Representative Paragraphs 1-13, wherein the transmission causes the mold plate to sequentially rotate at a first rotational velocity and a second rotational velocity that is lower than the first rotational velocity, wherein the transmission causes the mold plate to rotate at the second rotational velocity when one of the first or second plurality of voids is disposed in registry with the empty space of the first cover plate or outside of the first cover plate and when one of the first second plurality of voids is disposed in registry with at least one of the first and second apertures of the first cover plate, wherein the transmission causes the mold plate to rotate at the first rotational velocity when the first and second plurality of voids is not disposed in registry with either of the empty space or outside of the first cover plate or the first and second apertures of the first cover plate.

Representative Paragraph 15: The apparatus of any one of Representative Paragraphs 1-14, wherein the first cover plate is disposed with respect to the mold plate with a space established between the mold plate and the first cover plate.

Representative Paragraph 16: The apparatus of any one of Representative Paragraphs 1-15, wherein the mold plate comprises first and second mold plates that are formed in the same manner, wherein the first mold plate rotates in a first rotational direction and the second mold plate rotates in a second rotational direction different from the first rotational direction.

Representative Paragraph 17: The apparatus of Representative Paragraph 16, wherein the first and second mold plates are aligned so that a portion of the first mold plate overlaps a portion of the second mold plate.

Representative Paragraph 18: The apparatus of any one of Representative Paragraphs 16-17, wherein the first cover plate is fixed with respect to the first and second mold plates, wherein the empty space of the first cover plate exposes an arc of each of the first and second mold plates, or the first cover plate does not enclose an arc of the first and second mold plates.

Representative Paragraph 19: The apparatus of Representative Paragraph 18, wherein the knock-out assembly is adapted to interact with the first and second mold plates thru the empty space or outside of the first cover plate simultaneously.

Representative Paragraph 20: The apparatus of Representative Paragraph 18 wherein the first cover plate has first and second sets of first and second apertures, with each of the sets in communication with each of the respective first and second mold plates to allow the filling system to simultaneously direct a flow of food product through the respective second apertures of the first cover plate and into the one or more voids of the respective first and second mold plates that are disposed in registry with the respective second apertures.

Representative Paragraph 21: The apparatus of Representative Paragraph 20, further comprising a vacuum system fixed to the first cover plate and in registry with each of the two first apertures, wherein the vacuum system extends through both of the two first apertures and into the one or more voids that are in registry with the respective first aperture.

Representative Paragraph 22: The apparatus of any one of Representative Paragraphs 41-21, further comprising a pump connected to the second aperture in the first cover plate, wherein the pump supplies a volume of flowing food product through the second aperture and into the void of the plurality of voids that is in registry with the second aperture.

Representative Paragraph 23: The apparatus of Representative Paragraph 22, wherein the pump supplies flowing food through the second aperture at a flow rate that allows for the flowing food product to fill the void in registry with the second aperture as the mold plate translates by rotation with respect to the second aperture and wherein each of the first plurality of voids are filled by the flowing food product with a single pass of each of the respective voids of the first plurality of voids with respect to the second aperture.

Representative Paragraph 24: An apparatus for preparing a plurality of uniformly formed food products, comprising:
a mold plate with a plurality of voids disposed therein, the mold plate comprising a center and an arcuate outer edge, the mold plate is rotatable about the center;
the plurality of voids are arranged with consistent spacing around the mold plate such that a center of each void of the plurality of voids is arranged at a consistent radial arc length from a center of the voids that are adjacent to the void;
a transmission disposed in conjunction with the mold plate to transfer torque to the mold plate to cause the mold plate to rotate about the center of the mold plate;
a first cover plate fixed with the mold plate rotatable about the first cover plate, the first cover plate disposed in parallel to the mold plate, a first aperture disposed through the first cover plate and a second aperture disposed through the first cover plate, wherein each void of the plurality of voids of the mold plate is aligned sequentially with the first aperture and then aligned with the second aperture as the mold plate is rotated about its center, the first cover plate defining an empty space that exposes an arc length of the mold plate as the mold plate rotates and covering a remaining portion of the mold plate or the dimensions of the first cover plate are such that a portion of the mold plate with the plurality of voids extend outside of the first cover plate
a knock-out assembly disposed with respect to the empty space to interact with the mold plate that is disposed in registry with the empty space of the first cover plate or the knock-out assembly is disposed outside of the first cover plate, wherein the knockout assembly interacts with voids disposed either within the empty space or outside of the first cover plate;
a filling system disposed in registry with the second aperture of the first cover plate to direct a flow of food product through the second aperture and into one or more voids of the mold plate that are disposed in registry with the second aperture.

Representative Paragraph 25: The apparatus of Representative Paragraph 24, further comprising a vacuum system fixed to the first cover plate and in registry with the first aperture such that vacuum force from the vacuum system extends through the first aperture and into one or more voids that are in registry with the first aperture.

Representative Paragraph 26: The apparatus of any one of Representative Paragraphs 24-25, further comprising a conveyor disposed below the empty space in the first cover plate or outside of the first cover plate.

Representative Paragraph 27: The apparatus of any one of Representative Paragraphs 24-26, further comprising a drive shaft that extends from the mold plate, wherein the transmission interacts with the drive shaft to cause the mold plate to rotate about the center of the mold plate.

Representative Paragraph 28: The apparatus of any one of Representative Paragraphs 24-27, further comprising a spacer that is fixed to the first cover plate and extends outside the outer edge of the mold plate.

Representative Paragraph 29: The apparatus of any one of Representative Paragraphs 24-28, wherein the mold plate is circular.

Representative Paragraph 30: The apparatus of any one of Representative Paragraphs 24-29, wherein the transmission causes the mold plate to sequentially rotate at a first rotational velocity and a second rotational velocity that is lower than the first rotational velocity, wherein the transmission causes the mold plate to rotate at the second rotational velocity when one of the plurality of voids is disposed in registry with the empty space of the first cover plate or outside of the first cover plate or when one of the plurality of voids is disposed in registry with at least one of the first and second apertures of the first cover plate, wherein the transmission causes the mold plate to rotate at the first rotational velocity when the none of the plurality of voids are disposed in registry with either of the empty space or outside of the first cover plate or the first and second apertures of the first cover plate.

Representative Paragraph 31: The apparatus of any one of Representative Paragraphs 24-30, wherein the first cover plate is disposed with respect to the mold plate with a space established between the mold plate and the first cover plate.

Representative Paragraph 32: The apparatus of any one of Representative Paragraphs 24-31, wherein the mold plate comprises first and second mold plates that are formed in the same manner, wherein the first mold plate rotates in a first rotational direction and the second mold plate rotates in a second rotational direction different from the first rotational direction.

Representative Paragraph 33: The apparatus of Representative Paragraph 32, wherein the first and second mold plates are aligned so that a portion of the first mold plate overlaps a portion of the second mold plate.

Representative Paragraph 34: The apparatus of Representative Paragraph 32, wherein the first cover plate is fixed with respect to the first and second mold plates, wherein the empty space of the first cover plate exposes an arc of each of the first and second mold plates, or the first cover plate does not enclose an arc of the first and second mold plates.

Representative Paragraph 35: The apparatus of any one of Representative Paragraphs 32-34, wherein the knock-out assembly is adapted to interact with the first and second mold plates thru the empty space or outside of the first cover plate simultaneously.

Representative Paragraph 36: The apparatus of any one of Representative Paragraphs 32-35 wherein the first cover plate has first and second sets of first and second apertures, with each of the sets in communication with each of the respective first and second mold plates to allow the filling system to simultaneously direct a flow of food product through the respective second apertures of the first cover plate and into the one or more voids of the respective first and second mold plates that are disposed in registry with the respective second apertures.

Representative Paragraph 37: The apparatus of Representative Paragraph 36, further comprising a vacuum system fixed to the first cover plate and in registry with each of the two first apertures, wherein the vacuum system extends through both of the two first apertures and into the one or more voids that are in registry with the respective first aperture.

Representative Paragraph 38: The apparatus of any one of Representative Paragraphs 34-37, further comprising a pump connected to the second aperture in the first cover plate, wherein the pump supplies a volume of flowing food product through the second aperture and into the void of the plurality of voids that is in registry with the second aperture.

Representative Paragraph 39: The apparatus of Representative Paragraph 38, wherein the pump supplies flowing food through the second aperture at a flow rate that allows for the flowing food product to fill the void in registry with the second aperture as the mold plate translates by rotation with respect to the second aperture and wherein each of the first plurality of voids are filled by the flowing food product with a single pass of each of the respective voids of the first plurality of voids with respect to the second aperture.

Representative Paragraph 40: An apparatus for preparing a plurality of uniformly formed food products, comprising:
a mold plate with a plurality of voids disposed therein, the mold plate comprising a center and an arcuate outer edge, the mold plate is rotatable about the center;
the plurality of voids collectively organized in close proximity to each other to establish a set of voids within the mold plate, wherein the voids within the set are disposed with a consistent spacing between adjacent voids, wherein no voids are located within the mold plate between the voids that are disposed at the opposite ends of the set of voids,
a transmission disposed in conjunction with the mold plate to transfer torque to the mold plate to cause the mold plate to rotate about the center of the mold plate;
a first cover plate fixed with the mold plate rotatable about the first cover plate, the first cover plate disposed in parallel to the mold plate, a first aperture disposed through the first cover plate and a second aperture disposed through the first cover plate, wherein each void of the plurality of voids of the mold plate is aligned sequentially with the first aperture and then aligned with the second aperture as the mold plate is rotated about its center, the first cover plate defining an empty space that exposes an arc length of the mold plate as the mold plate rotates and covering a remaining portion of the mold plate or the dimensions of the first cover plate are such that a portion of the mold plate with the plurality of voids extend outside of the first cover plate;
a knock-out assembly disposed with respect to the empty space to interact with the mold plate that is disposed in registry an the empty space defined within the first cover plate or the knock-out assembly is disposed outside of the first cover plate, wherein the knockout assembly interacts with voids disposed within the empty space or outside of the first cover plate;
a filling system disposed in registry with the second aperture of the first cover plate to direct a flow of food product through the second aperture and into one or more voids of the mold plate that are disposed in registry with the second aperture.

Representative Paragraph 41: The apparatus of Representative Paragraph 40, further comprising a vacuum system fixed to the first cover plate and in registry with the first aperture such that vacuum force from the vacuum system extends through the first aperture and into one or more voids that are in registry with the first aperture.

Representative Paragraph 42: The apparatus of any one of Representative Paragraphs 40-41, further comprising a conveyor disposed below the empty space in the first cover plate or outside of the first cover plate.

Representative Paragraph 43: The apparatus of any one of Representative Paragraphs 40-42, further comprising a drive shaft that extends from the mold plate, wherein the transmission interacts with the drive shaft to cause the mold plate to rotate about the center of the mold plate.

Representative Paragraph 44: The apparatus of any one of Representative Paragraphs 40-43, wherein the knock-out assembly comprises a plurality of knock-out cups that are disposed in registry with the empty space in the first cover plate or outside of the first cover plate.

Representative Paragraph 45: The apparatus of Representative Paragraph 44, wherein each of the plurality of knock-out cups translate linearly in unison between a withdrawn position and an engaged position, wherein in the withdrawn position the plurality of knock-out cups are disposed away from the mold plate and wherein in the engaged position the plurality of knockout cups extend to a position proximate to or within aligned voids of the mold plate.

Representative Paragraph 46: The apparatus of Representative Paragraph 45, wherein each of the plurality of knock-out cups are disposed in registry with one of the plurality of voids of the mold plate that are disposed within the empty space of the first cover plate or outside of the first cover plate when the plurality of knock-out cups are translated to the engaged position such that bottom surfaces of each of the plurality of knock-out cups contact food product disposed within the void in registry with the knock-out cup, which urges food product within the respective void out of the void to fall away from the mold plate.

Representative Paragraph 47: The apparatus of Representative Paragraph 46, wherein each of the plurality of knock-out cups are disposed in registry with the plurality of voids of the mold plate when the plurality of knockout cups are translated to the engaged position, wherein a portion of each knock-out cup extends within a respective void, which applies a force to the food product disposed within the respective void, which urges the food product out of the void to fall away from the mold plate.

Representative Paragraph 48: The apparatus of any one of Representative Paragraphs 40-47, further comprising a spacer that is fixed to the first cover plate and extends outside the outer edge of the mold plate.

Representative Paragraph 49: The apparatus of any one of Representative Paragraphs 40-48, wherein the mold plate is circular.

Representative Paragraph 50: The apparatus of any one of Representative Paragraphs 40-49, wherein the plurality of voids within the first set include first and second rows of voids and the plurality of voids within the second set include first and second rows of voids, wherein each of the voids of the first row of voids are aligned along a first arcuate line with a first constant radius, and each of the voids of the second row of voids are aligned along a second arcuate line with a second constant radius that is smaller than the first constant radius.

Representative Paragraph 51: The apparatus of Representative Paragraph 50, wherein centers of the plurality of voids of each of the first and second rows are spaced a distance greater from the centers of adjacent voids than a diameter of each of the plurality of voids.

Representative Paragraph 52: The apparatus of Representative Paragraph 50, wherein each of the first and second rows include the same number of the plurality of voids, wherein each void disposed along the first row is aligned with a radial line through the center of the respective void, wherein the radial line extends through the center of a void disposed within the second row of the plurality of voids.

Representative Paragraph 53: The apparatus of any one of Representative Paragraphs 40-52, wherein the transmission causes the mold plate to sequentially rotate at a first rotational velocity and a second rotational velocity that is lower than the first rotational velocity, wherein the transmission causes the mold plate to rotate at the second rotational velocity when the plurality of voids is disposed in registry with the empty space of the first cover plate or outside of the first cover plate and when the plurality of voids is disposed in registry with at least one of the first and second apertures of the first cover plate, wherein the transmission causes the mold plate to rotate at the first rotational velocity when the plurality of voids is not disposed in registry with either of the empty space or outside of the first cover plate or the first and second apertures of the first cover plate.

Representative Paragraph 54: The apparatus of any one of Representative Paragraphs 40-53, wherein the first cover plate is disposed with respect to the mold plate with a space established between the mold plate and the first cover plate.

Representative Paragraph 55: The apparatus of any one of Representative Paragraphs 40-54, wherein the mold plate comprises first and second mold plates that are formed in the same manner, wherein the first mold plate rotates in a first rotational direction and the second mold plate rotates in a second rotational direction different from the first rotational direction.

Representative Paragraph 56: The apparatus of Representative Paragraph 55, wherein the first and second mold plates are aligned so that a portion of the first mold plate overlaps a portion of the second mold plate.

Representative Paragraph 57: The apparatus of any one of Representative Paragraphs 55-56, wherein the first cover plate is fixed with respect to the first and second mold plates, wherein the empty space of the first cover plate exposes an arc of each of the first and second mold plates, or the first cover plate does not enclose an arc of the first and second mold plates.

Representative Paragraph 58: The apparatus of Representative Paragraph 57, wherein the knock-out assembly is adapted to interact with the first and second mold plates thru the empty space or outside of the first cover plate simultaneously.

Representative Paragraph 59: The apparatus of Representative Paragraph 57 wherein the first cover plate has first and second sets of first and second apertures, with each of the sets in communication with each of the respective first and second mold plates to allow the filling system to simultaneously direct a flow of food product through the respective second apertures of the first cover plate and into the one or more voids of the respective first and second mold plates that are disposed in registry with the respective second apertures.

Representative Paragraph 60: The apparatus of Representative Paragraph 59, further comprising a vacuum system fixed to the first cover plate and in registry with each of the two first apertures, wherein the vacuum system extends through both of the two first apertures and into the one or more voids that are in registry with the respective first aperture.

Representative Paragraph 61: The apparatus of any one of Representative Paragraphs 40-60, further comprising a pump connected to the second aperture in the first cover plate, wherein the pump supplies a volume of flowing food product through the second aperture and into the void of the plurality of voids that is in registry with the second aperture.

Representative Paragraph 62: The apparatus of Representative Paragraph 61, wherein the pump supplies flowing food through the second aperture at a flow rate that allows for the flowing food product to fill the void in registry with the second aperture as the mold plate translates by rotation with respect to the second aperture and wherein each of the first plurality of voids are filled by the flowing food product with a single pass of each of the respective voids of the first plurality of voids with respect to the second aperture.

The invention claimed is:
1. An apparatus for preparing a plurality of uniformly formed food products, comprising:
   a mold plate with a plurality of voids disposed therein, the mold plate comprising a center and an arcuate outer edge, the mold plate is rotatable about the center;
   the plurality of voids collectively organized into a first set and a second set, the plurality of voids within the first set disposed with a consistent spacing between adjacent voids and the plurality of voids arranged within the second set disposed with a consistent spacing between adjacent voids, wherein a void at an end of the voids of the first set is further from a closest void within the second set than a spacing of adjacent voids within the first set and a spacing of adjacent voids within the second set, wherein no voids are located within the mold plate between the voids of the first set and the voids of the second set,
   a transmission disposed in conjunction with the mold plate to transfer torque to the mold plate to cause the mold plate to rotate about the center of the mold plate;
   a first cover plate fixed with the mold plate rotatable about the first cover plate, the first cover plate disposed in parallel to the mold plate, a first aperture disposed through the first cover plate and a second aperture disposed through the first cover plate, wherein each void of the plurality of voids of the mold plate is aligned sequentially with the first aperture and then aligned with the second aperture as the mold plate is rotated about its center, the first cover plate defining an empty space that exposes an arc length of the mold plate as the mold plate rotates and covering a remaining portion of the mold plate;
   a knock-out assembly disposed with respect to the empty space to interact with the mold plate that is disposed in registry with the empty space of the first cover plate or the knock-out assembly is disposed outside of the first cover plate, wherein the knockout assembly interacts with voids disposed within the empty space or outside of the first cover plate;
   a filling system disposed in registry with the second aperture of the first cover plate to direct a flow of food product through the second aperture and into one or more voids of the mold plate that are disposed in registry with the second aperture.
2. The apparatus of claim 1, further comprising a vacuum system fixed to the first cover plate and in registry with the first aperture such that vacuum force from the vacuum system extends through the first aperture and into one or more voids that are in registry with the first aperture.

3. The apparatus of claim 1, further comprising a conveyor disposed below the empty space in the first cover plate or outside of the first cover plate.

4. The apparatus of claim 1, further comprising a drive shaft that extends from the mold plate, wherein the transmission interacts with the drive shaft to cause the mold plate to rotate about the center of the mold plate.

5. The apparatus of claim 1, wherein the knock-out assembly comprises a plurality of knock-out cups that are disposed in registry with the empty space in the first cover plate or outside of the first cover plate.

6. The apparatus of claim 5, wherein each of the plurality of knock-out cups translate linearly in unison between a withdrawn position and an engaged position, wherein in the withdrawn position the plurality of knock-out cups are disposed away from the mold plate and wherein in the engaged position the plurality of knockout cups extend to a position proximate to or within aligned voids of the mold plate.

7. The apparatus of claim 6, wherein each of the plurality of knock-out cups are disposed in registry with one of the plurality of voids of the mold plate that are disposed within the empty space of the first cover plate or outside of the first cover plate when the plurality of knock-out cups are translated to the engaged position such that bottom surfaces of each of the plurality of knock-out cups contact food product disposed within the void in registry with the knock-out cup, which urges food product within the respective void out of the void to fall away from the mold plate.

8. The apparatus of claim 6, wherein each of the plurality of knock-out cups are disposed in registry with one of the first or second plurality of voids of the mold plate when the plurality of knockout cups are translated to the engaged position, wherein a portion of each knock-out cup extends within a respective void, which applies a force to the food product disposed within the respective void, which urges the food product out of the void to fall away from the mold plate.

9. The apparatus of claim 1, further comprising a spacer that is fixed to the first cover plate and extends outside the outer edge of the mold plate.

10. The apparatus of claim 1, wherein the mold plate is circular.

11. The apparatus of claim 1, wherein the plurality of voids within the first set include first and second rows of voids and the plurality of voids within the second set include first and second rows of voids, wherein each of the voids of the row of voids of both of the respective first and second sets of voids are aligned along a first arcuate line with a first constant radius, and each of the voids of the second row of voids of both of the respective first and second sets of voids are each aligned along a second arcuate line with a second constant radius that is smaller than the first constant radius.

12. The apparatus of claim 11, wherein centers of the plurality of voids of each of the first and second rows are spaced a distance greater from the centers of adjacent voids than a diameter of each of the plurality of voids.

13. The apparatus of claim 11, wherein each of the first and second rows include the same number of the plurality of voids, wherein each void disposed along the first row is aligned with a radial line through the center of the respective void, wherein the radial line extends through the center of a void disposed within the second row of the plurality of voids.

14. The apparatus of claim 1, wherein the transmission causes the mold plate to sequentially rotate at a first rotational velocity and a second rotational velocity that is lower than the first rotational velocity, wherein the transmission causes the mold plate to rotate at the second rotational velocity when one of the first or second plurality of voids is disposed in registry with the empty space of the first cover plate or outside of the first cover plate and when one of the first or second plurality of voids is disposed in registry with at least one of the first and second apertures of the first cover plate, wherein the transmission causes the mold plate to rotate at the first rotational velocity when the first and second plurality of voids is not disposed in registry with either of the empty space or outside of the first cover plate or the first and second apertures of the first cover plate.

15. The apparatus of claim 1, wherein the first cover plate is disposed with respect to the mold plate with a space established between the mold plate and the first cover plate.

16. The apparatus of claim 1, wherein the mold plate comprises first and second mold plates that are formed in the same manner, wherein the first mold plate rotates in a first rotational direction and the second mold plate rotates in a second rotational direction different from the first rotational direction.

17. The apparatus of claim 16, wherein the first and second mold plates are aligned so that a portion of the first mold plate overlaps a portion of the second mold plate.

18. The apparatus of claim 16, wherein the first cover plate is fixed with respect to the first and second mold plates, wherein the empty space of the first cover plate exposes an arc of each of the first and second mold plates, or the first cover plate does not enclose an arc of the first and second mold plates.

19. The apparatus of claim 18, wherein the knock-out assembly is adapted to interact with the first and second mold plates thru the empty space or outside of the first cover plate simultaneously.

20. The apparatus of claim 18 wherein the first cover plate has first and second sets of first and second apertures, with each of the sets in communication with each of the respective first and second mold plates to allow the filling system to simultaneously direct a flow of food product through the respective second apertures of the first cover plate and into the one or more voids of the respective first and second mold plates that are disposed in registry with the respective second apertures.

21. The apparatus of claim 20, further comprising a vacuum system fixed to the first cover plate and in registry with each of the two first apertures, wherein the vacuum system extends through both of the two first apertures and into the one or more voids that are in registry with the respective first aperture.

22. The apparatus of claim 1, further comprising a pump connected to the second aperture in the first cover plate, wherein the pump supplies a volume of flowing food product through the second aperture and into the void of the plurality of voids that is in registry with the second aperture.

23. The apparatus of claim 22, wherein the pump supplies flowing food through the second aperture at a flow rate that allows for the flowing food product to fill the void in registry with the second aperture as the mold plate translates by rotation with respect to the second aperture and wherein each of the first plurality of voids are filled by the flowing food product with a single pass of each of the respective voids of the first plurality of voids with respect to the second aperture.

* * * * *